(12) United States Patent
LeBlanc et al.

(10) Patent No.: US 7,571,949 B2
(45) Date of Patent: Aug. 11, 2009

(54) SIDEWALL PANEL AND TARPAULIN COVER SYSTEM FOR FLAT BED TRAILERS, AND TRUCK TRAILER INCORPORATING SAME

(76) Inventors: Sheri LeBlanc, DeMonte Fabricating Ltd. 4975 8$^{th}$ Concession - R.R. #3, Maidstone, Ontario (CA) N0R 1K0; Tim DeMonte, DeMonte Fabricating Ltd. 4975 8$^{th}$ Concession - R.R. #3, Maidstone, Ontario (CA) N0R 1K0; Walt DeMonte, DeMonte Fabricating Ltd. 4975 8$^{th}$ Concession - R.R. #3, Maidstone, Ontario (CA) N0R 1K0

( * ) Notice: Subject to any disclaimer, the term of this patent is extended or adjusted under 35 U.S.C. 154(b) by 0 days.

(21) Appl. No.: 12/072,614

(22) Filed: Feb. 27, 2008

(65) Prior Publication Data

US 2008/0150308 A1    Jun. 26, 2008

Related U.S. Application Data

(62) Division of application No. 11/486,958, filed on Jul. 14, 2006, now Pat. No. 7,350,842.

(51) Int. Cl.
*B61D 3/08* (2006.01)
*B62D 33/033* (2006.01)

(52) U.S. Cl. ............................ 296/43; 105/380

(58) Field of Classification Search ........... 296/32, 296/182.1, 183.1, 186.1, 186.5, 36, 43, 100.01, 296/100.17, 101, 181.1, 186.4, 191; 105/380, 105/390, 391
See application file for complete search history.

(56) References Cited

U.S. PATENT DOCUMENTS 2,823,066 A * 2/1958 Maxson .................. 296/29
3,010,755 A * 11/1961 Black ..................... 296/186.5
3,252,730 A * 5/1966 Chieger et al. ........ 296/186.5
3,794,375 A    2/1974 Woodward
3,811,724 A    5/1974 Woodward
3,837,702 A * 9/1974 Case ....................... 296/36
3,871,702 A * 3/1975 Glassmeyer ............. 296/36
3,917,338 A * 11/1975 Becker ................... 410/116

(Continued)

FOREIGN PATENT DOCUMENTS

EP    5120 A1 * 10/1979

(Continued)

*Primary Examiner*—Glenn Dayoan
*Assistant Examiner*—Paul A Chenevert
(74) *Attorney, Agent, or Firm*—Carrier, Blackman & Associates, P.C.; Joseph P. Carrier; William D. Blackman

(57) ABSTRACT

A cover system for a support surface on a vehicle includes multiple retaining pockets disposed at a lateral side of the vehicle adjacent the support surface, multiple stakes having lower ends which are removably received in said retaining pockets, respectively, such that the stakes extend substantially perpendicular to the support surface, multiple panels retained by said stakes at the lateral side of the vehicle, a rail supported on upper surfaces of said stakes such that the rail extends substantially parallel to a longitudinal direction of the vehicle, and a locking mechanism which selectively locks the rail to at least one of said stakes and at least one of said pockets.

12 Claims, 35 Drawing Sheets

U.S. PATENT DOCUMENTS

| | | | |
|---|---|---|---|
| 4,018,480 A * | 4/1977 | Stone | 298/27 |
| 4,042,275 A | 8/1977 | Glassmeyer | |
| 4,067,601 A | 1/1978 | Tuerk | |
| 4,236,748 A * | 12/1980 | Cloutier et al. | 296/43 |
| 5,080,422 A | 1/1992 | DeMonte et al. | |
| 5,152,575 A | 10/1992 | DeMonte et al. | |
| 5,320,396 A | 6/1994 | Petelka | |
| 5,924,759 A | 7/1999 | DeMonte et al. | |
| 6,322,127 B1 * | 11/2001 | Masterson et al. | 296/100.02 |
| 2007/0029838 A1 * | 2/2007 | Brennan | 296/182.1 |

FOREIGN PATENT DOCUMENTS

| | | | |
|---|---|---|---|
| EP | 310157 A1 * | 4/1989 | |
| GB | 2209712 A * | 5/1989 | |
| JP | 59167378 A * | 9/1984 | |

* cited by examiner

48

FIG. 7A
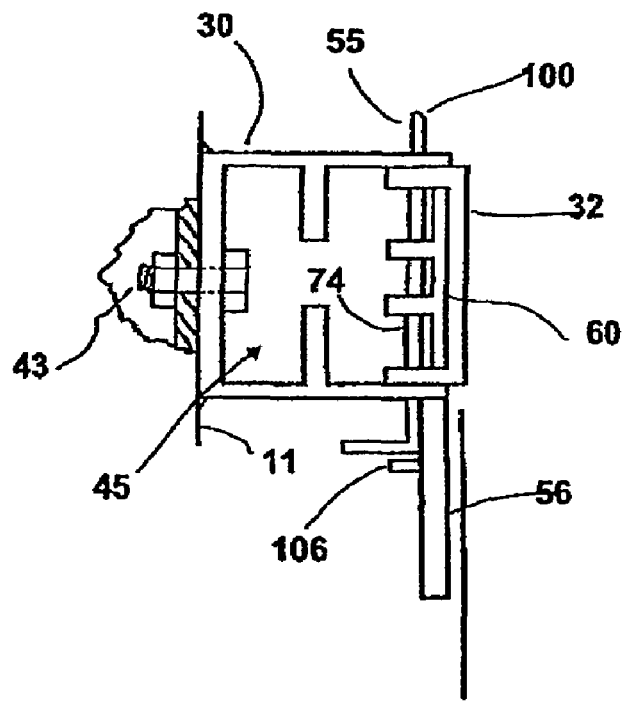
FIG. 7B
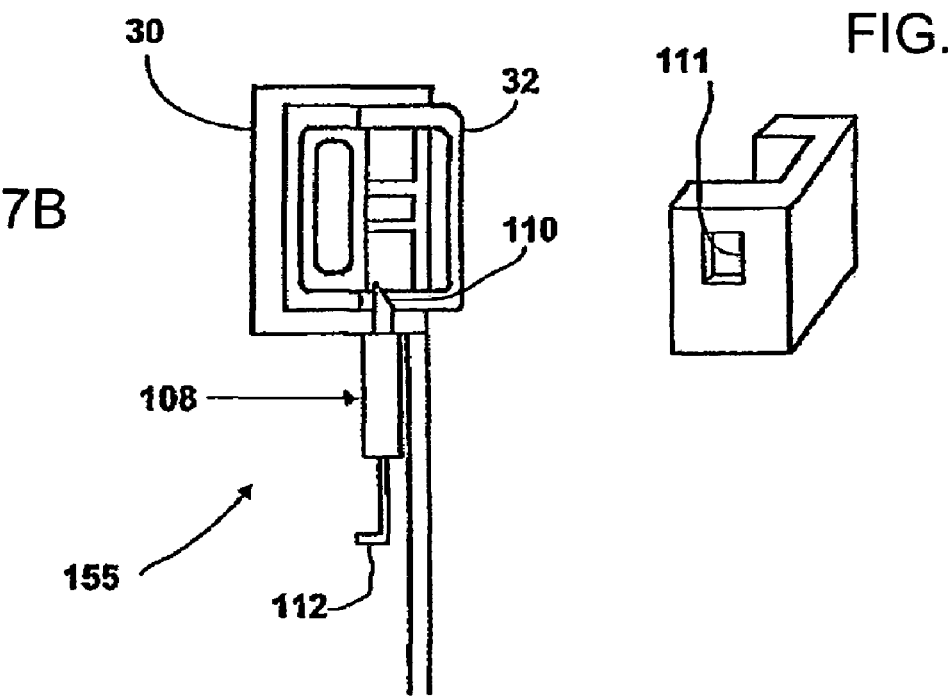
FIG. 7C

A + C     Run on outside

B + D     Run on inside

To achieve Total Compaction

SIDEWALL PANEL AND TARPAULIN COVER SYSTEM FOR FLAT BED TRAILERS, AND TRUCK TRAILER INCORPORATING SAME

CROSS REFERENCE TO RELATED APPLICATIONS

The present application is a divisional of, and claims priority under 35 USC 121 based on U.S. patent application Ser. No. 11/486,958, filed 14 Jul. 2006, the entire disclosure of which is incorporated herein by reference.

BACKGROUND OF THE INVENTION

1. Field of the Invention

The present invention relates to a system and apparatus for enclosing a flat bed trailer or vehicle with removable, stake-supported sidewall panels and a bow-supported tarpaulin cover, and also relates to a flat-bed truck trailer incorporating the cover system. More particularly, the present invention relates to such a system and trailer which provides improved convenience, safety, weather-resistance, fuel and storage efficiency, aesthetic appeal, as well as additional advantages, in comparison to other known tarpaulin cover systems.

2. Description of the Background Art

Removable cover systems for flatbed trailers and the like, including stake-supported panels extending longitudinally along sides of the trailer and a bow-supported tarp cover secured over the trailer and the upper portions of the panels are well known. These systems are typically referred to as tarp-and-rack systems or side kits, and versions of these systems have been commercially available for a number of years.

For example, FIG. 21 herein depicts a portion of a flatbed trailer 1 having conventional stake-retaining pockets 2 fixed/welded to a side surface thereof, and a flat elongate bumper bar 3 fixed to the outside surfaces of the pockets. FIG. 22 herein depicts a conventional stake 4 having a vertical side edge of a panel 5 inserted in a receiving recess 6 of the stake, where the stake is suspended above a receptacle socket 7 of a conventional pocket 2. It is notable that in the prior art design depicted in FIG. 22, the panel 5 is rests on and is supported by a side edge portion of the trailer 1, and a main body portion of the stake 4 extends outwardly beyond the side edge of the trailer 1, and outboard of the panel 5.

Over the years, some efforts have been made to address a number of disadvantages with previous systems.

For example, U.S. Pat. No. 3,794,375 to Woodward discloses a flatbed enclosure system having stakes, panels and a tarp cover, but wherein the panel edge receiving recesses of the stakes are notched in a vertically spaced manner and the edges of the panels having associated recesses defined therealong as shown in FIG. 10 of the '375 patent. With such structure, the stake does not have to be completely removed in order to release the panels, and this is desirable because the stakes are typically around four feet long, and are usually removed by sliding their entire length vertically above the panels. Due to the notched structure, a panel may be raised only several inches until the recesses in its side edges are aligned away from the stake notches, at which point the panel may be removed with the stake still retained on the trailer.

U.S. Pat. No. 3,811,724 discloses a flatbed enclosure system having two-section stakes, wherein an inner section may be separated from an outer section via vertical sliding movement to facilitate removal of the panels, which have vertical side edges retained in recesses defined between the two sections of the stakes. However, an individual must typically be standing inside the trailer to manipulate the two-section stakes. Also, this patent discloses special cargo-securing brackets (see FIGS. 6-7 of the '724 patent) having first ends fixed to sides of the flatbed, and which extend inwardly of the cargo space between the upper surface of the flatbed and the lower edges of the panels such that the second ends of the brackets may have cargo-securing straps or chains connected thereto. These brackets avoid the conventional necessity of extending the cargo-securing straps and chains between the flatbed and lower edges of the panels, and thus also avoid the conventional gaps created by same.

U.S. Pat. No. 4,067,601 discloses a stake arrangement for these types of systems in which the stakes are generally triangular in cross sectional shape rather than a simple rectangle, while a lower portion of the stake, as received by the retaining pockets on the trailer, is provided with a jacket which strengthens and enlarges the stake at the lower portion, and is tapered or the like to provide a relatively tight fit between the outer surface of the jacket and the inner surface of a retaining pocket.

U.S. Pat. No. 5,320,396 discloses a flatbed enclosure system having a stake construction in which an outer surface of the stake is rounded off, to improve the aerodynamics of the trailer when the enclosure system is installed.

U.S. Pat. No. 4,042,275 discloses a cap that attaches to the upper end of stakes used in a flatbed enclosure system. The cap prevents water and debris from entering the inner cavity of the stake. Additionally, the stake cap also provides a receiving hole for a tarp support bow.

The known tarp-and-rack systems provide several beneficial features, including that they are partially or fully removable, thereby permitting a user to uncover selected portions of the trailer for loading and unloading cargo, and because the systems are relatively inexpensive in comparison, for example, to permanent trailer cover systems such as the aluminum shells used to cover many trailers.

However, the known systems also have disadvantages associated therewith. For example, it is labor-intensive to install or remove such a system, e.g., edges of the tarp cover are secured with numerous elastic cords or the like to the flatbed trailer, the stakes and panels must be individually, manually installed and removed, and the person operator doing the installation and removal must typically be standing on the trailer, which is highly inconvenient (especially if cargo is loaded on the trailer), and also potentially dangerous.

Further, the stakes are disposed outwardly of the panels, such that the system does not have a smooth continuous outer surface and is not particularly aerodynamic. Often there is a loose fit between the stakes and retaining pockets for same provided at the sides of the trailer, such that the stakes and the panels rattle and move when the vehicle is traveling.

Still further, lower edges of the panels are typically supported on upper, outermost surfaces of the flatbed. This not only reduces cargo space on the trailer, but due to curvature of the flatbed in the longitudinal direction, gaps are formed between the panels and the trailer surface, permitting water, dirt and other matter to enter the enclosed space within the cover system, which is undesirable for many reasons. Further, if the cargo must be secured to the trailer, as is often the case, securing straps and chains must typically pass between the panels and the flatbed surface creating additional gaps. As may be appreciated, the conventional systems do not have a particularly aesthetic appearance.

Although some of the disadvantages of some older conventional systems have been addressed, as discussed above, a need still exists in the art for an improved flatbed cover system which more completely addresses all of the disadvantages attendant the conventional systems. In particular, there is a need for such an improved system that may be readily, conveniently and safely installed or removed by an individual standing at ground level adjacent a flatbed trailer, has significantly improved aerodynamic, water- and weather-tight, and aesthetic characteristics, and is otherwise superior to the known trailer cover systems.

SUMMARY OF THE INVENTION

The present invention has been created with the intention of meeting the discussed need.

It is a first object of the present invention to provide an improved tarpaulin and stake-supported panel cover system for a flatbed trailer. A system according to an illustrative embodiment hereof includes a plurality of panels and support stakes, and a rail-based, elevated retractable tarpaulin cover system, which combine to form a versatile enclosure that can be operated in any number configurations. Such a system allows a flat bed trailer to be used in a flexible and versatile way, for a large number of hauling needs.

While enclosing a flat bed trailer can be useful for certain hauling tasks, trailer owners desire the flexibility to selectively use portions or all of the cover system. A second object of this invention is to provide a cover system of the discussed type including various components that can be conveniently and quickly installed—removed as needed or desired.

It is a third object of the present invention to provide a cover system which permits side panels and support stakes of the cover system to be conveniently installed and removed by a person standing on the ground adjacent to the flatbed trailer.

Versatility is key to this invention, and it is a fourth object of this invention to provide a cover system of the discussed type that can be partially installed or removed to facilitate loading and unloading the cargo.

It is a fifth object of this invention to provide a cover system of the discussed type including a tarp cover that eliminates the conventional need for rope or strap tie downs, and which also facilitates movement of the tarp cover.

It is a sixth object of this invention to provide stakes that allow for sidewall panels to be attached such that the stakes and panels form a substantially flat and uniform outer sidewall surface for improved aerodynamics, improved appearance and increased cargo space.

It is a seventh object of this invention to provide better protection from the elements by reliably sealing the spaces between various components of the system and the flatbed trailer.

It is an eighth object of this invention to provide a cover system that can be disassembled and compactly stored on the trailer when not being used.

According to a first aspect of the invention there is provided, in a cover system for a substantially flat support surface on a vehicle including stake-supported panels, a stake-retaining pocket, which includes a base section adapted to be fixed to the vehicle; and a movable section which may be moved relative to the base section to define open and closed positions thereof. The base section and the movable section cooperate to form the stake-retaining pocket, when the movable section is in the closed position thereof.

Such a stake-retaining pocket according to the first aspect is very advantageous because, among other things, it permits panels and stakes to be conveniently installed/removed by persons standing adjacent to the vehicle.

According to a second aspect of the present invention, the cover system may also or alternatively include a stake having an end which may be retained in the pocket, and wherein the stake includes an inner section, and an outer section selectively connectable to said inner section so as to define a pair of panel edge-receiving recesses between the inner and outer sections; wherein the inner section has a greater thickness than that of the outer section, and the outer section includes a portion separating said panel edge-receiving recesses when the inner and outer sections are connected together.

Again, such a stake according to the second aspect is very advantageous because, among other reasons, it permits panels and stakes to be conveniently installed/removed by persons standing adjacent to the vehicle, especially if used together with the stake-retaining pocket according to the first aspect of the invention.

According to a third aspect of the invention, an outer portion of said stake outer section is a substantially planar member defining an outer wall of the panel edge-receiving recesses, such that an outermost surface of the stake outer section is substantially flush with outermost surfaces of the panels when the panels edges are received in the recesses.

Such structure according to the third aspect is advantageous because (among other reasons) it provides the cover system with a desirably aerodynamic, aesthetic and smooth outer surface, and also because it increases the effective, usable storage space for cargo.

According to a fourth aspect of the invention, a seal is provided that is adapted to be disposed between a lower portion of a panel supported by the stake and a surface of the vehicle, and the seal may be an elongate elastic member adapted to extend longitudinally of the vehicle.

Such a seal according to the fourth aspect of the invention is very advantageous because (among other reasons) there may tend to be a substantial space between the lower portions of the panels and vehicle, and the seal is effective to prevent water and other foreign matter from passing through the space into the cargo enclosure. Also, because the seal is elastic, cargo-securing chains, ropes, straps, etc. may readily pass between the seal and the vehicle while the seal remains in close contact therewith.

According to a fifth aspect of the invention, the cover system may also include a rail which may be selectively fitted along upper surfaces of the stake and the panel, and a locking mechanism which secures the rail, the stake and the pocket tightly together.

Such cover system according to the fifth aspect of the invention is very advantageous because (among other reasons) the panels and stakes are maintained in desired positions on the vehicle, with little movement of same while the vehicle is traveling, unlike in conventional cover systems including stake-supported panels.

According to a sixth aspect of the invention, the cover system may further include a retractable tarp cover apparatus, comprising a tarp cover adapted to extend over the substantially flat support surface, bows which support the tarp cover thereon, rails extending longitudinally on opposite sides of the vehicle and secured to upper surfaces of the stakes, and guide assemblies including wheels which are engaged with the rails for rolling movement therealong, wherein the bows have ends operatively connected to the guide assemblies such that the bows and tarp cover are moveable together with the guide assemblies. Also, lower side portions of the tarp cover may extend outwardly of the guide assemblies, and lowermost side edges of the tarp cover extend inwardly of the vehicle near the rails and below the guide carriages.

Such cover system according to the sixth aspect of the invention is very advantageous because (among other reasons) the retractable cover apparatus is much more convenient to use, aesthetic in appearance, and watertight than conventional cover systems including stake-supported panels.

For a more complete understanding of the present invention, the reader is referred to the following detailed description section, which should be read in conjunction with the accompanying drawings. Throughout the following detailed description and in the drawings, like numbers refer to like parts.

Intent Of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

There have been chosen specific embodiments of a cover system according to the invention and specific alternative structures and modifications thereto, the embodiments chosen for the purposes of illustration and description of the structure and method of the invention are shown in the accompanying drawings forming a part of the specification, in which

BRIEF DESCRIPTION OF THE DRAWINGS

FIG. 7A is a plan view, partially cut away, of an embodiment of a pocket latch according to the invention, which mechanism secures the stake within the closed retainer pocket, with an inner portion of the stake omitted from the drawing for illustrative purposes.

FIG. 7B is a top plan view of another embodiment of the pocket latch according to the invention.

FIG. 7C is a perspective view of the movable pocket section modified to cooperatively receive a latch of the locking mechanism of FIG. 7B therein.

DETAILED DESCRIPTION OF PRESENTLY CONTEMPLATED EMBODIMENTS

Overview

A number of selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art. These illustrative embodiments are removable cover systems for being mounted on flatbed trailers, other vehicles or the like, and various components of such systems.

Figure 1:
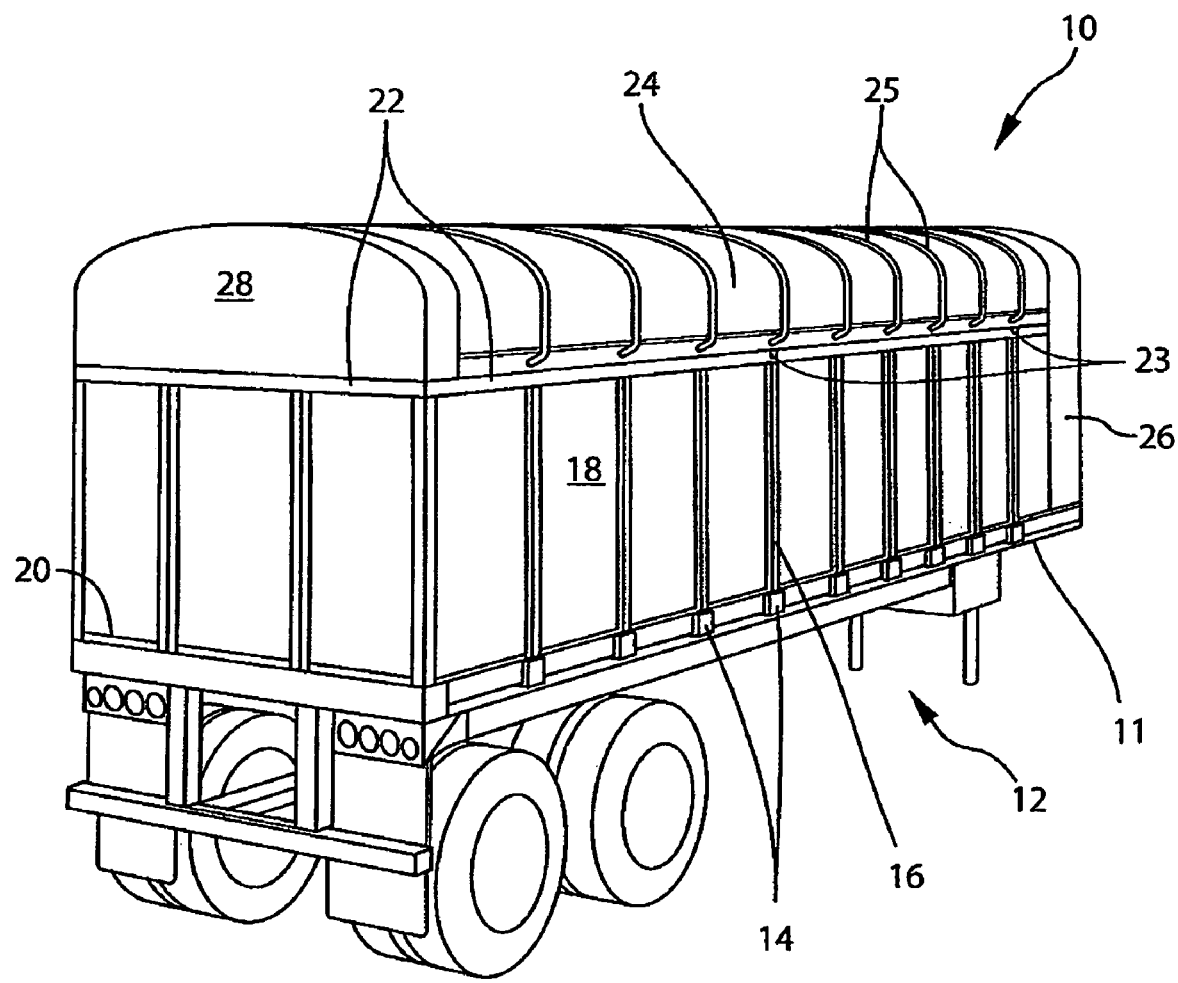
FIG. 1 is a rear side perspective view of a truck trailer incorporating an illustrative embodiment of a cover system according to the present invention.

With reference to FIG. 1, there is shown a flatbed trailer 12 equipped with a cover system 10 according to a selected illustrative embodiment of the invention, where the system has been fully installed and deployed on a flatbed trailer 12 to cover a load carried on the trailer. The system 10 includes several components, most of which may be readily, manually attached to or removed from the trailer 12, by a user standing at ground level next to the trailer. The system 10 includes a plurality of retainer pockets 14, disposed in a spaced manner along opposite longitudinal sides and a rear end of the trailer, a plurality of stakes 16 having lower ends retentively fitted in the pockets, and a plurality of panels 18. Each of the panels 18 is disposed and supported between a pair of the stakes 16, such that the panels and stakes form side (and possibly rear) walls of the cover system 10. The system 10 also includes a plurality of seal members 20 extending between lower ends of the panels 18 and the flatbed trailer 12.

The system 10 further includes a plurality of rail sections 22, extending along the opposite longitudinal sides and rear end of the trailer above upper edges of the stakes and panels. The rail sections 22 are secured to upper ends of the stakes 16, and may have open gaps 23 provided therebetween to allow for flexing of the trailer bed 11 during over-the road travel. The system 10 also includes a tarp cover 24 disposed above, and extending between the rails 22, a plurality of movable bows 25 which support the cover 24 on the rails, a front headboard 26 at a front end of the trailer, and an end cap 28 at a rear end of the trailer above the rear end portion of the rails. Each of the various components are more specifically discussed below. Further, while all of the disclosed components may be combined in a given cover system, it is not required that all components be used together.

Retainer Pockets

Figure 2A:
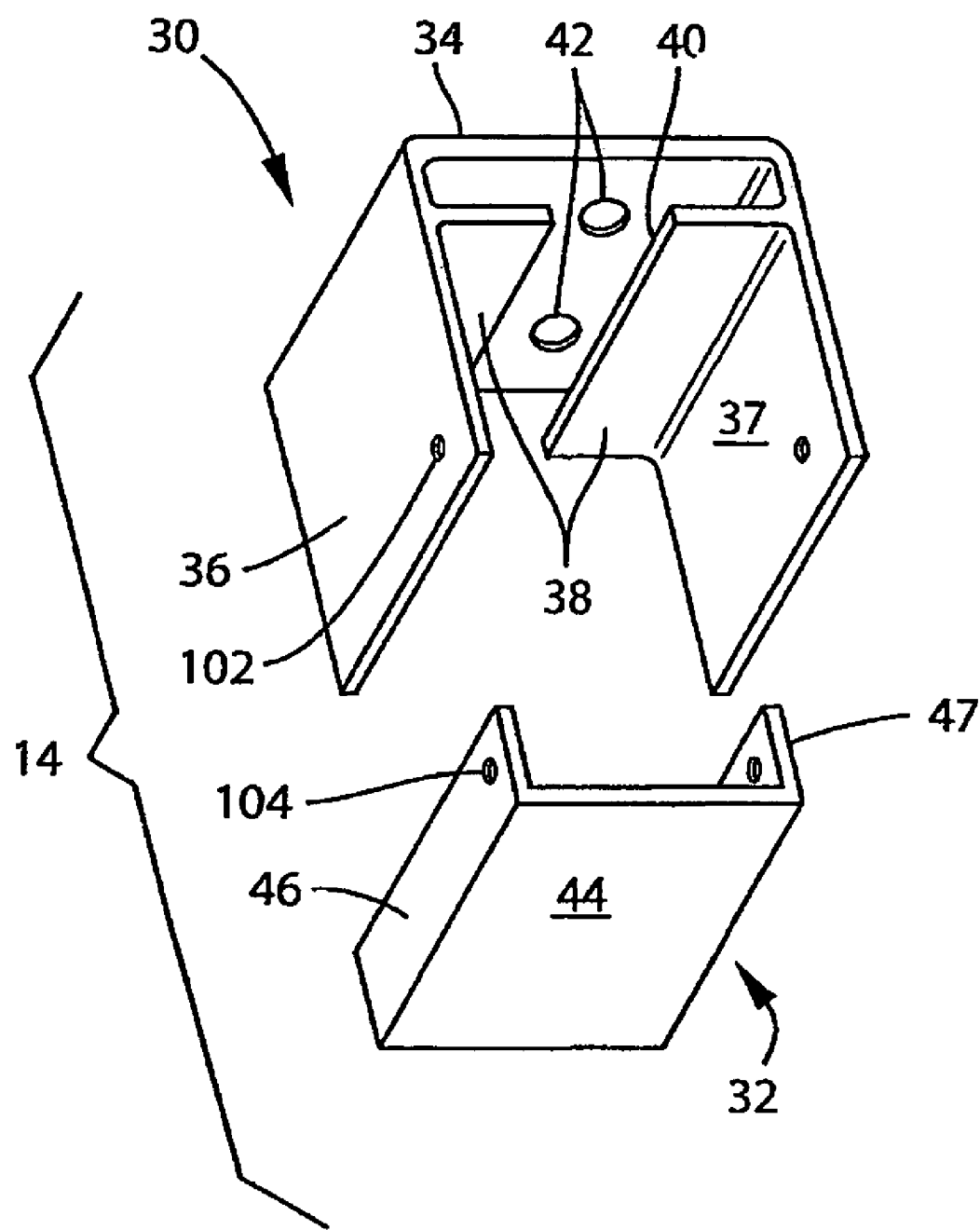
FIG. 2A is an exploded perspective view of a retainer pocket according to an embodiment of the invention.
Figure 2C:
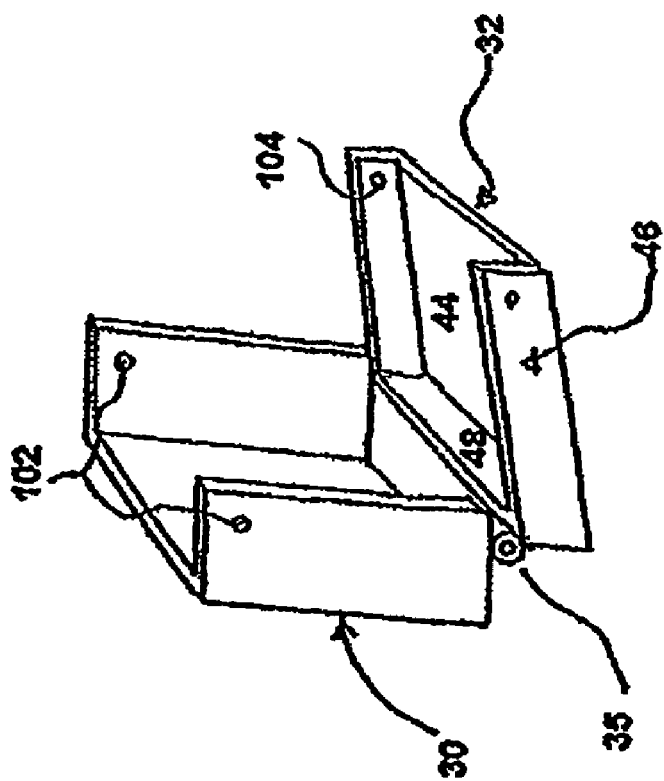
FIG. 2C is a perspective view of the retainer pocket of FIG. 2A, shown in an open position.
Figure 2B:
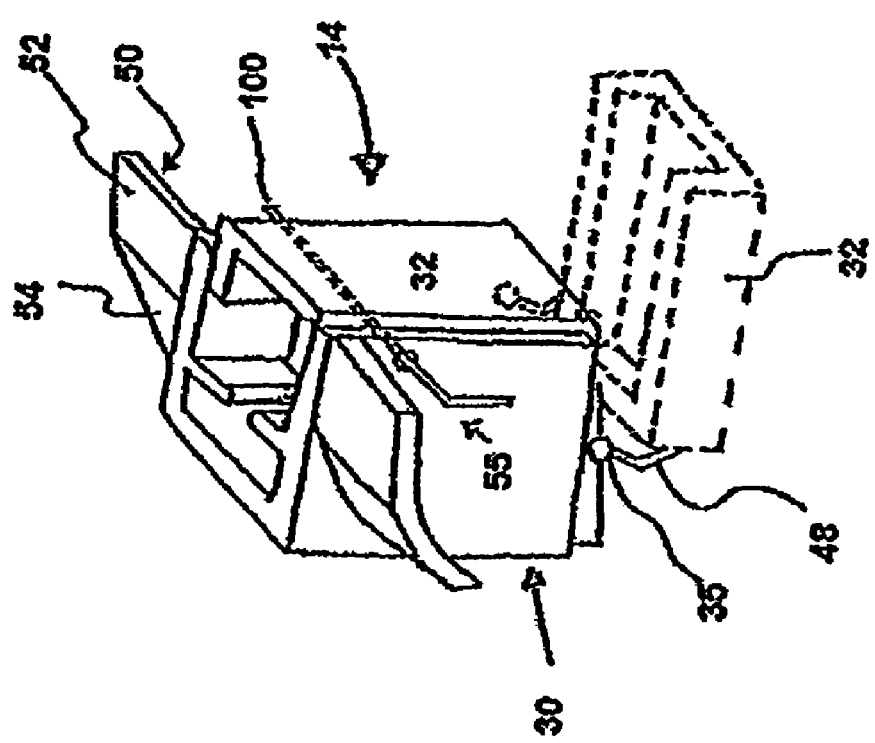
FIG. 2B is a perspective view of a modified embodiment of a retainer pocket according to the invention, including panel-supporting extensions.

With reference to FIGS. 2A-2B, the retainer pockets 14, according to a first embodiment of the invention, include an inner or base section 30 and an outer or movable section 32 which may be selectively disposed in closed (stake-retaining) or open positions relative to the base section. The inner, base section 30 and the movable outer section 32 are collectively described herein as pocket sections 30, 32. The pocket sections 30, 32 may be formed of an appropriate material(s) such as aluminum, steel, composites, strong plastics, or combinations of these materials.

The base section 30 may be an integral, unitary member with a substantially C-shaped profile as viewed from above, as shown in FIG. 2A, although other shapes may be used if desired, e.g., curved, polygonal, etc. The depicted base section of FIG. 2A includes an inner attachment surface 34 which is adapted to be fixed to the trailer bed 11, two spaced apart parallel side walls 36, 37 extending outwardly from opposite ends of the attachment surface, and a pair of spaced apart co-planar spacer walls 38 which extend inwardly from each of the respective side walls parallel to and spaced away from the attachment surface, with a central gap 40 provided between the inner ends of the spacer walls 38, to allow access for mounting bolts.

The attachment surface 34 of the base section 30 may have one or more mounting holes 42 formed therein, to facilitate attachment to side edges of the trailer bed 11 using one or more bolts 43, as shown in FIG. 7A. A space 45 is defined within the base member 30, between the spacer walls 38 and the attachment surface 34, which is useful for disposition and manipulation of the bolts 43, keeps the bolt heads separated from a stake 16 supported in the retaining pocket 14, etc. The spacer walls 38 could be omitted if desired, such as for example where the base section 30 is welded to the side edge of the trailer, or in the embodiment of FIGS. 6A-6B where the base member 30 is integrally formed as part of the trailer bed 11.

The movable section 32 may be a relatively shallow member, with a cross-sectional C-shape as shown in FIG. 2A, including an outer wall 44 which forms the outermost surface of the retaining pocket when in the closed position, and a pair of spaced-apart side walls 46, 47 extending transversely inwardly from opposed ends of the outer wall 44. The movable section 32 may be configured and dimensioned so that the side walls 46, 47 thereof may extend either inside or outside of the base section 30 in the closed position, as noted.

Referring now to FIGS. 2B-2C, the pocket sections 30, 32 may be connected via a hinge 35 extending horizontally along a bottom, inner edge of the movable section 32 and across a bottom surface of the base section 30, such that the movable section 32 may be pivoted relative to the base section 30 to establish the open and closed positions of the pocket 14.

Figure 3C:
FIGS. 3A-3D are perspective views of other, alternate embodiments of retainer pockets according to the invention.
Figure 3B:
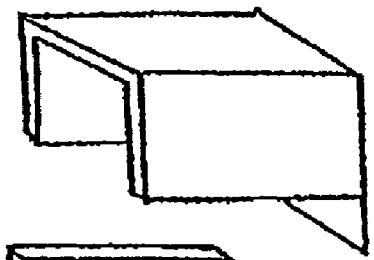
Figure 3A:
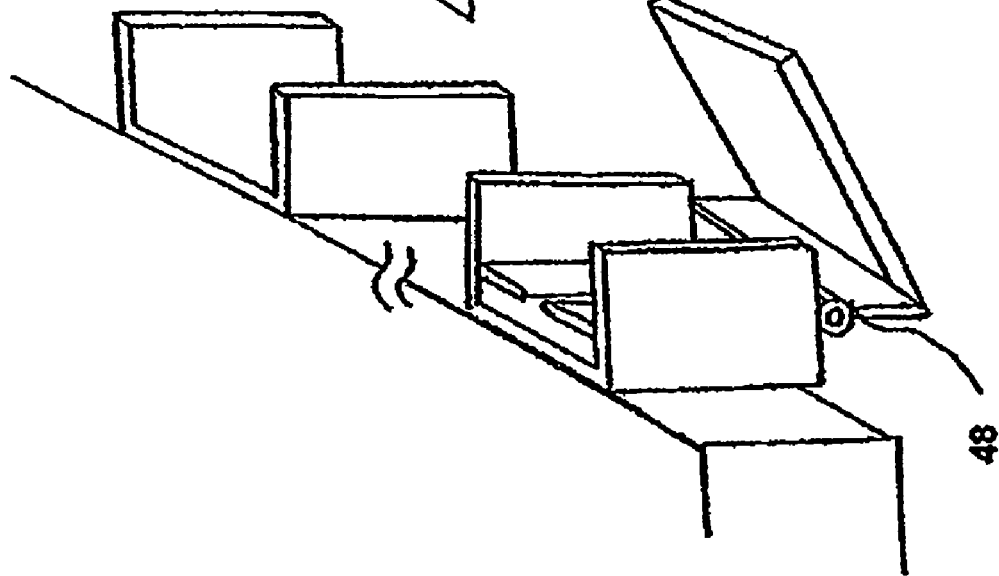
Figure 3A:
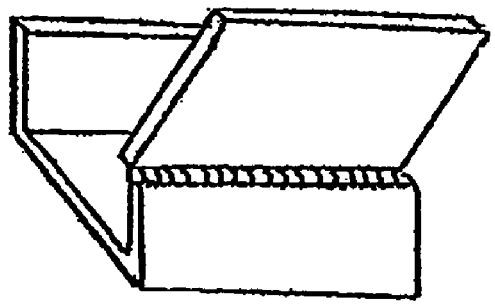
Figure 3D:
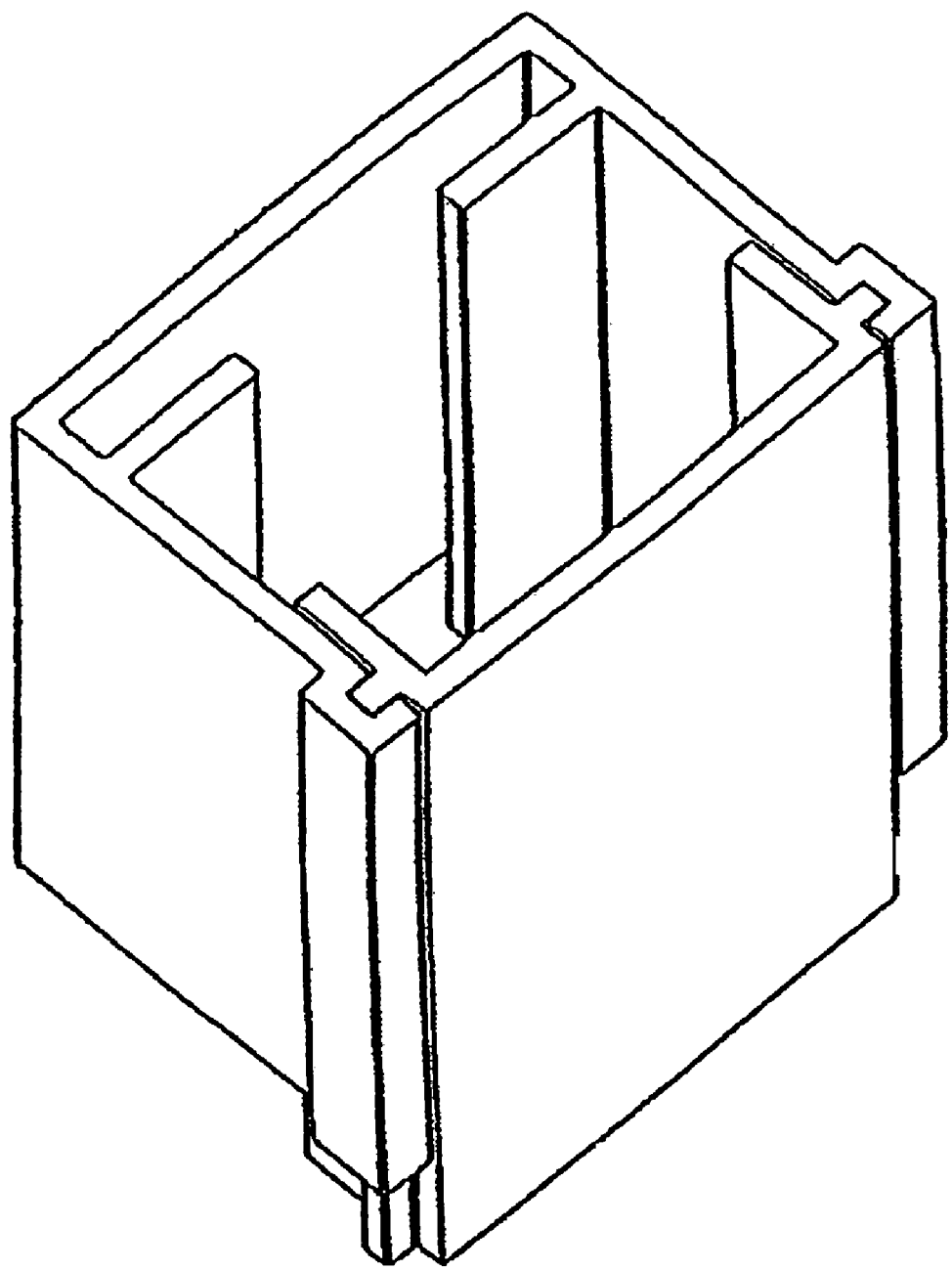

It is not essential that the pocket sections 30, 32 have the specific shapes and the hinged configuration shown in FIG. 2B, rather, it is only essential that the retaining pocket is selectively and adjustably disposable in open and closed positions. For example, the hinge 35 my be disposed vertically between the pocket sections 30, 32 as shown in FIG. 3A, the bottom wall of the movable section 32 may be angled as shown in FIG. 3B, the sections may be completely separable without a hinge connection as shown in FIG. 3C, or the retainer pocket may have a curved, rounded, polygonal, or other shape, etc.

Figures 21, 22:
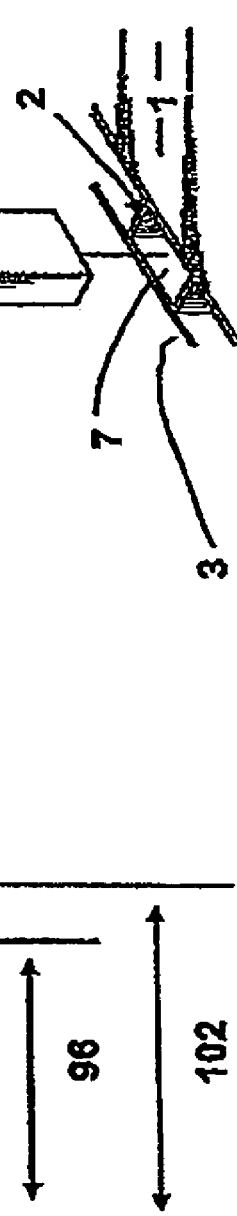
FIG. 21 is a perspective view of a portion of a prior art trailer having conventional stake-receiving pockets affixed to the side of the trailer.
FIG. 22 is an exploded perspective view of a portion of a prior art trailer showing a conventional stake adapted to have a lower end thereof inserted in the conventional pocket, and a conventional panel having a vertical side edge thereof inserted in a receiving recess of the stake.

The multi-part retaining pocket 14 is an important aspect of the present invention, and represents a significant improvement over conventional pockets of known covering systems of this type. The conventional retainer pockets are very typically one-piece, rectangular, tubular members made of metal such as aluminum or steel, and are welded to the longitudinal sides of the flatbed trailer in spaced disposition, as shown in FIGS. 21 and 22 of the drawings. Because of such conventional construction, the stakes supported thereby must be vertically lifted to be removed from the pockets, again, typically by a person standing in the flatbed trailer.

Due to the multiple-section construction of the retaining pocket 14 according to the invention, however, it becomes possible for a person standing on the ground adjacent to the flatbed trailer to conveniently remove the stakes from the retaining pockets, as discussed further below.

The inner or base section 30 is fixed to a side portion of the flatbed trailer 12 in an appropriate manner, such as welding or via threaded bolts or other fasteners. The base section 30 may be an integral, unitary member with a substantially C-shaped cross section, as shown, although other shapes may be used if desired, e.g., curved, polygonal, etc.

Figure 6A:
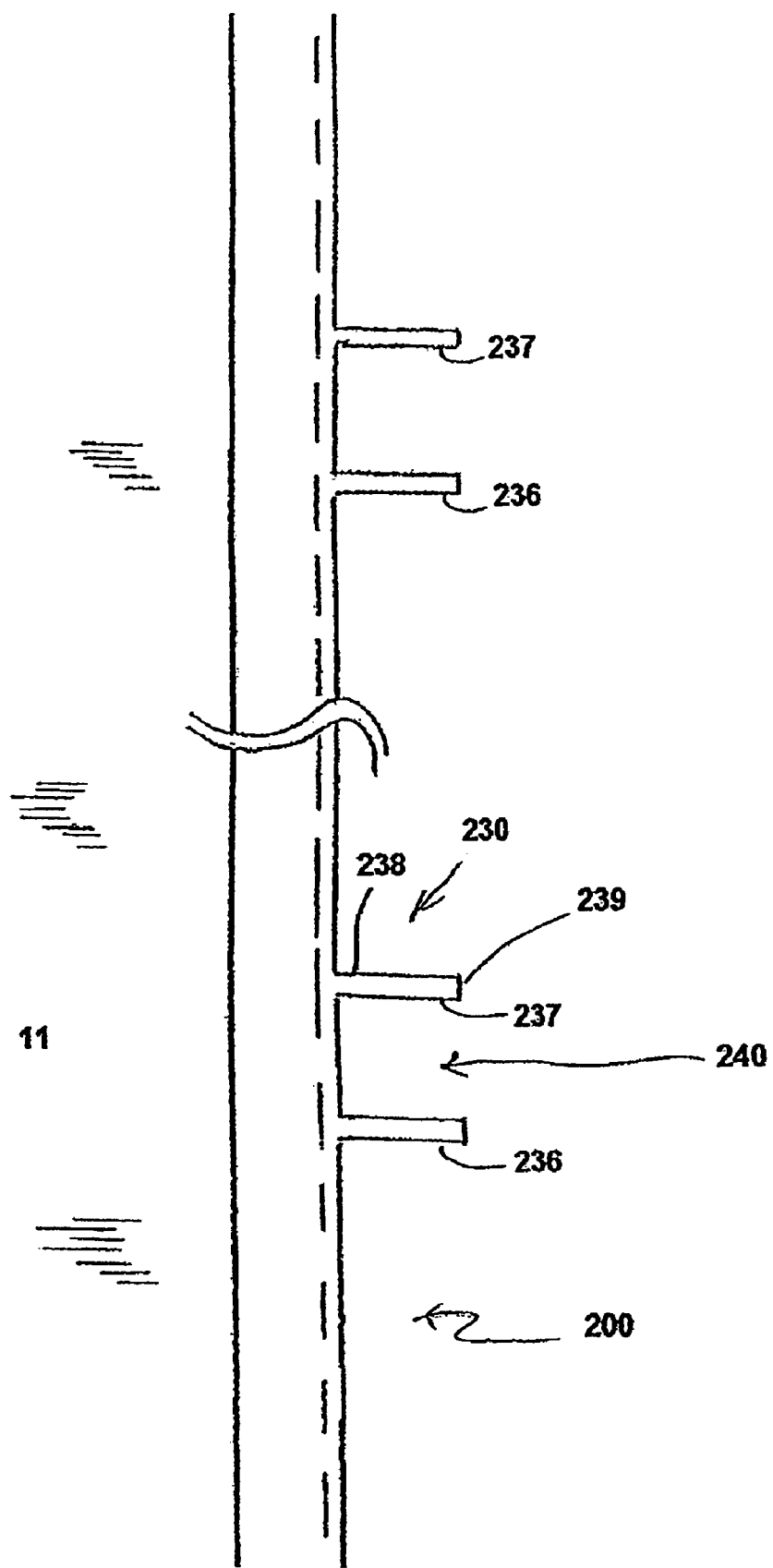
FIG. 6A is a top plan view of a side edge portion of a trailer having integral fixed pocket sections thereon according to another embodiment hereof.
Figure 6B:
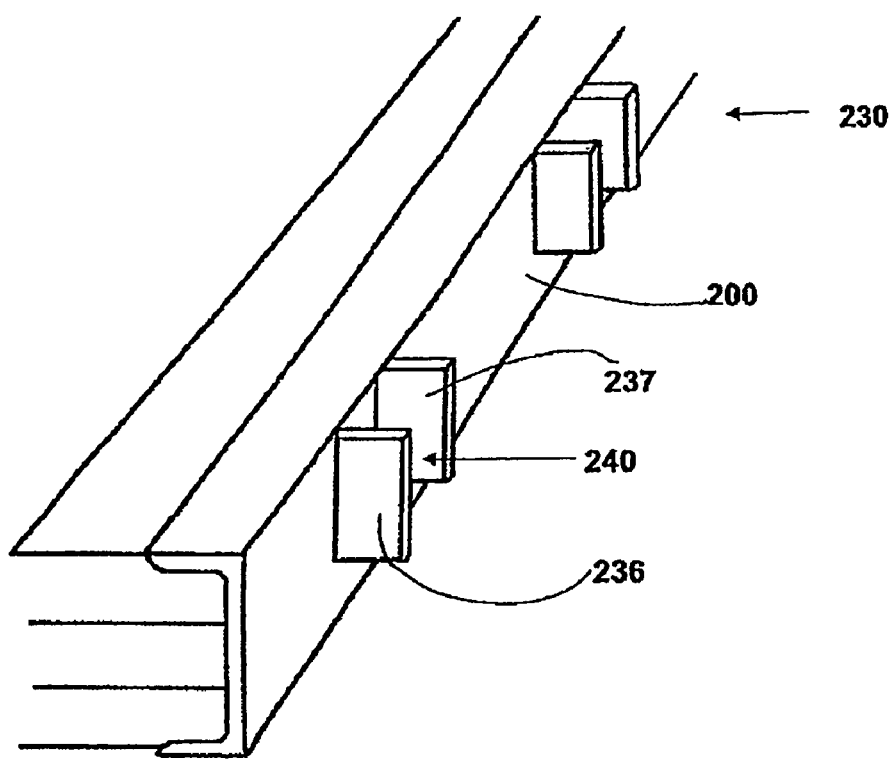
FIG. 6B is a perspective view of the trailer and fixed pocket sections of FIG. 6A.

Referring now to FIGS. 6A-6B, an alternate embodiment of a base section is shown at 230, and in this embodiment, the base section is integrally affixed to, and made part of a side edge reinforcement 200 which is an integral side portion of the trailer flat bed 11.

In the embodiment of FIGS. 6A-6B, the side edges of the trailer bed 11 have a plurality of pairs of substantially vertical spaced-apart plates 236, 237 affixed thereto and extending outwardly therefrom. Each of the plates 236, 237 includes a proximal end 238 which is operatively attached to one of the side edges of the trailer bed 11, and a distal end 239 spaced outwardly from the proximal end. An open space 240 is formed in the fixed pocket section 230 between the distal ends 239 of adjacent plates 236, 237 for receiving a movable pocket section therein, such as the movable pocket section 32 of FIG. 2A. Each pair of adjacent plates 236, 237 is adapted to cooperate with a movable pocket section, such as the section 32, to define a stake-receiving pocket 14.

Figure 5:
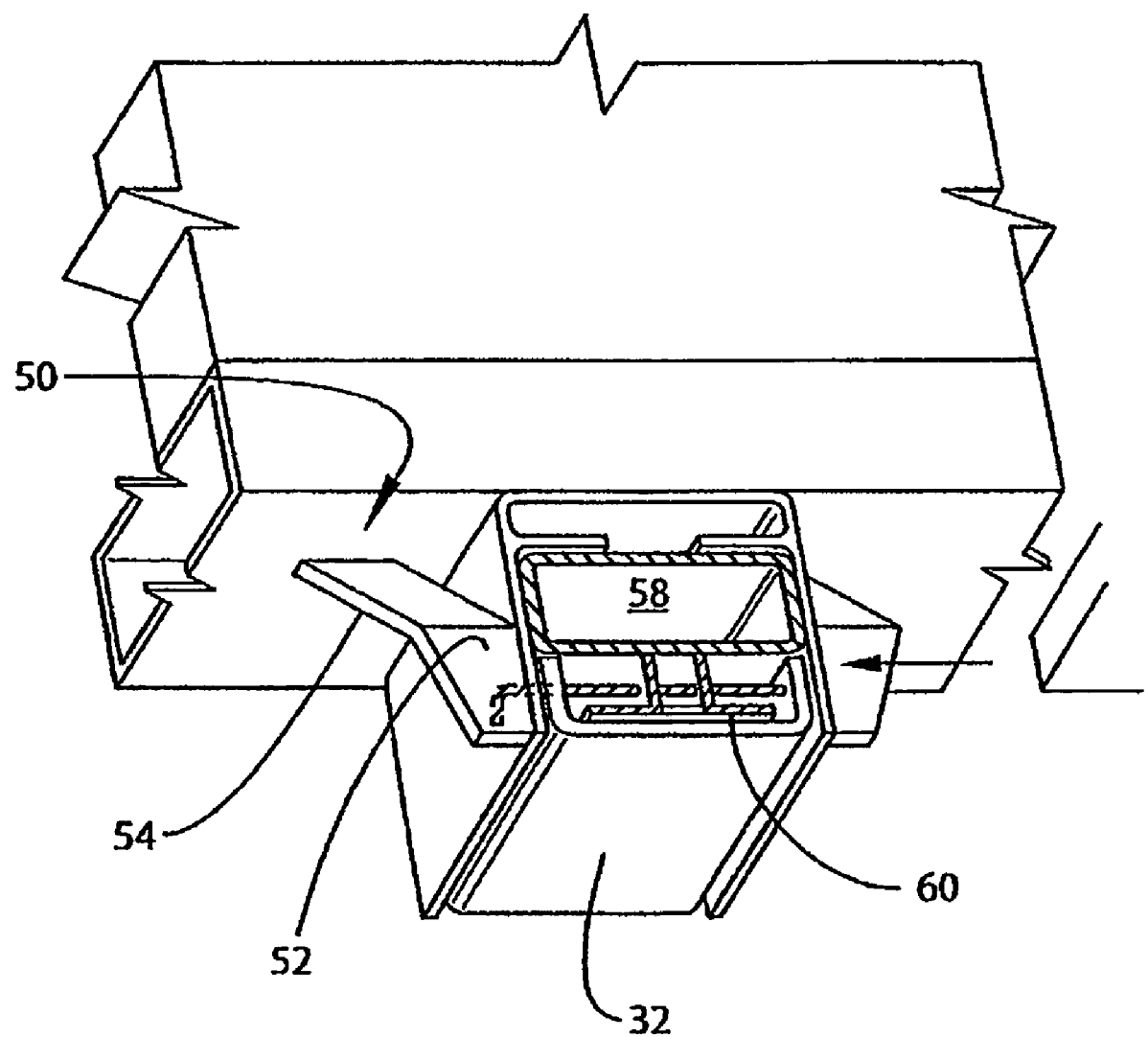
FIG. 5 is a perspective view, partially in cross-section, showing the retainer pocket of FIGS. 2A, 2B mounted to an edge portion of flatbed trailer, wherein a lower portion of the stake of FIG. 4A is disposed in the retainer pocket.

Although omitted from FIGS. 6A-6B for purposes of illustration, it will further be understood that the fixed pocket sections 230 of the embodiment shown in FIGS. 6A-6B may also be provided with panel support brackets of the type shown in FIGS. 2B and 5, and as further discussed herein, if desired.

As seen in FIG. 2C, the movable section 32 may, optionally, include a lower wall 48 extending between end edges of the side walls, and the hinge 35 may be connected to the lower wall and/or to the side walls. Again, however, the shapes of the base and movable sections 30, 32 can be variously modified as desired, the hinge 35 can be omitted or located differently, etc., as long as the base section 30 and the outer section 32 are movable relative to one another, to establish the open and closed positions of the retaining pocket 14.

Pocket Latch

For securely maintaining the movable section 32 in the closed position, a pocket latch 55, such as shown in FIGS. 7A and 7B (discussed below) may be used. The pocket latch 55 of FIGS. 7A and 7B, according to an embodiment of the present invention, includes a pin 100 which may be inserted through respective openings 102, 104 (FIG. 2A) formed in the base and movable sections 30, 32, respectively, of the retaining pocket 14. The pin 100 may be substantially L-shaped, as depicted, such that the longer portion thereof may be extended through the openings 102, 104 to maintain the pocket in the closed position thereof. Optionally, the pin 100 may include a spring-loaded detent ball inside of a distal end thereof, to temporarily retain the pin in place in the retaining pocket 14 when installed therein.

The pin 100 may be removed as needed, when the trailer 12 is stationary, to permit the movable section 32 to be moved to establish the open position of the pocket 14. The shorter portion of the pin 100 may extend at a right angle to the longer portion, and can function as a handle for gripping and manipulating the pin.

Figure 4A:
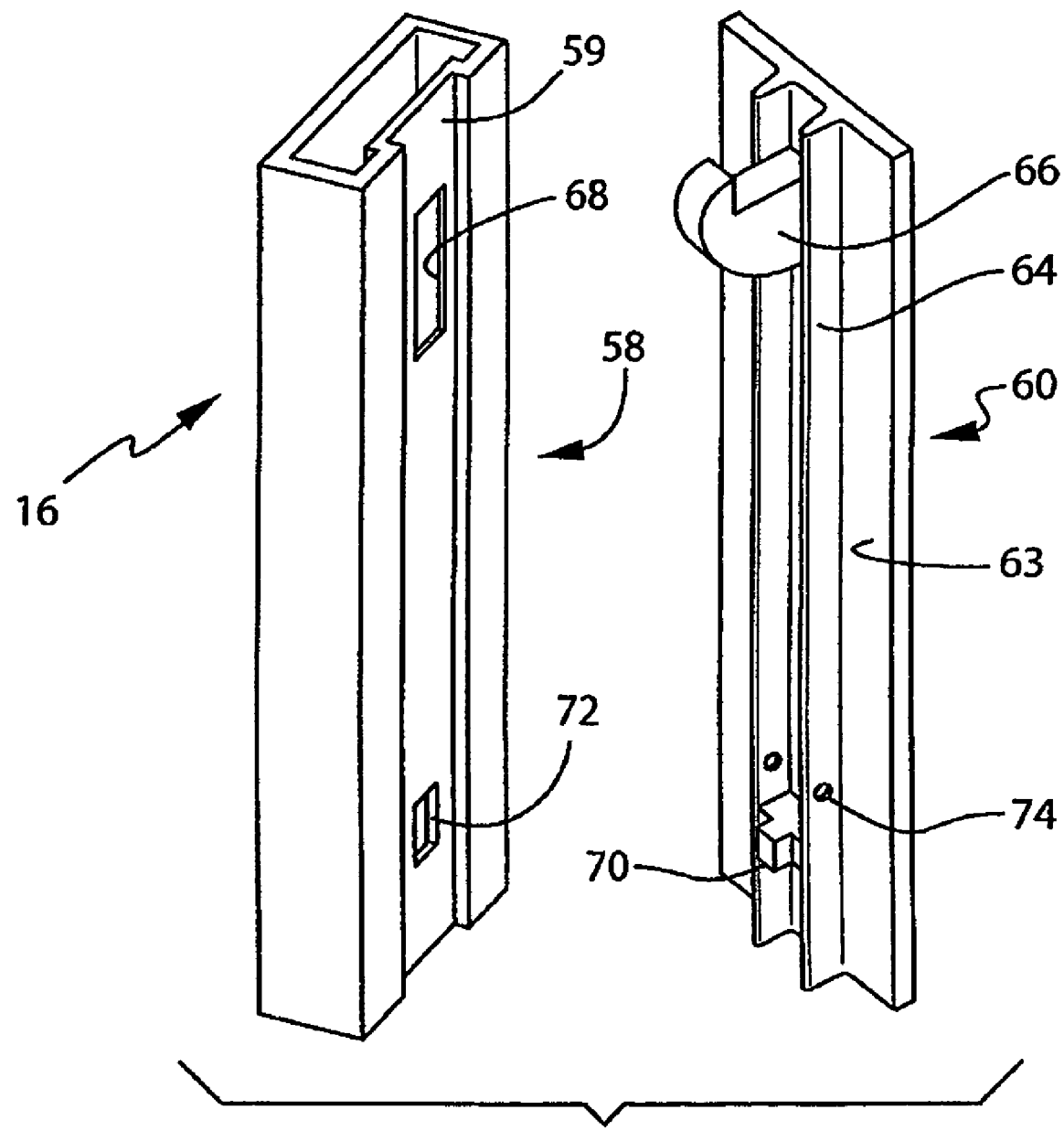
FIG. 4A is an exploded perspective view of a first embodiment of a two-part stake according to the invention.

As shown in FIGS. 4A and 7A, and as discussed further below, an outer section 60 of the stake 16 may also include openings 74 through which the pin 100 may be extended, to secure the stake 16 in place in the closed pocket 14. Further, as depicted a stopper 106 may optionally be provided near the pocket, e.g., extending from an outer protective rail 56 to prevent the pin 100 from being unintentionally displaced from the openings 102, 104, e.g., when the trailer is moving. Particularly, the stopper 106 is disposed at a level below the openings 102, 104 by a distance which is less than the length of the shorter portion of the pin 100.

For insertion into the openings, the pin 100 is manipulated such that the shorter portion thereof is facing toward the trailer above the stopper 106, and after insertion, the shorter portion is rotated downwardly, such that it will contact the stopper 106 if the pin starts to move out of the openings, and will be prevented from further movement in such direction by the stopper. Also, the force of gravity will normally maintain the shorter portion of the pin 100 pointing downwardly.

With reference to FIG. 7B, there is shown a second, alternative embodiment of a pocket latch 155 according to the invention. In this embodiment, the pocket latch 155 includes a spring-biased locking member 108 mounted to the base member 30 at one side of the pocket 14. The locking member 108 includes an engaging member 110 which may be extended through openings 111 formed in the side walls of the base and movable sections of the pocket, respectively, when the pocket is in its closed position, and a handle 112 which can be manipulated to lock the engaging member 110 in the latched position thereof, or to release the engaging member from the movable member 32.

Again, a stopper, such as the stopper 106 in the first embodiment of the locking mechanism, may optionally be provided to operatively engage the handle 112 to prevent unwanted movement thereof as in the first embodiment, or alternatively, an internal spring may be provided to urge the engaging member 110 into the openings 111 of the pocket 14.

Stakes

Figure 4B:
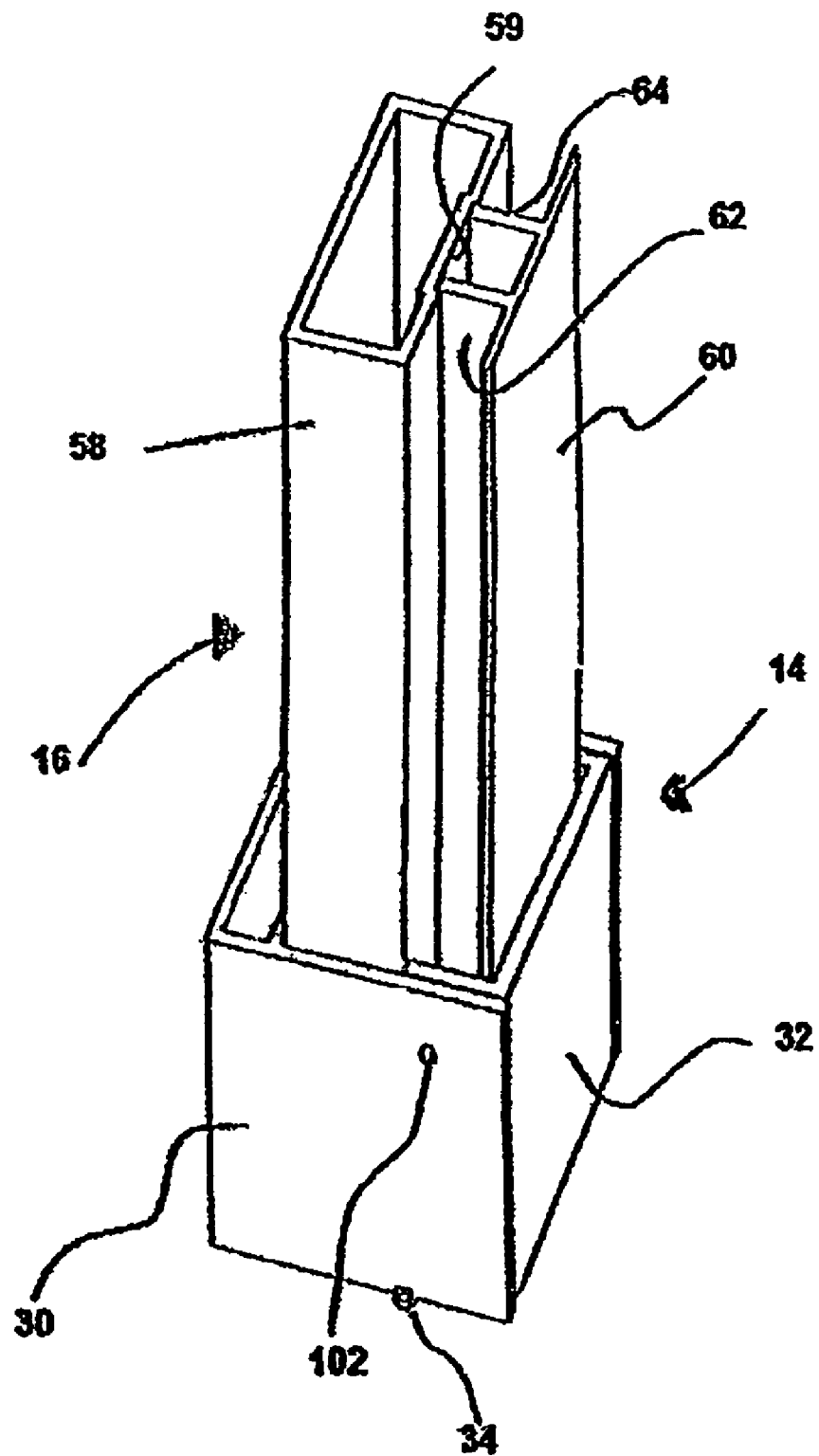
FIG. 4B is a perspective view of the stake of FIG. 4A shown assembled and installed in a pocket according to an embodiment of the invention.

With reference to FIGS. 4A and 4B, there is shown a stake 16 according to an illustrative embodiment of the invention, and this stake includes an inner section 58 and an outer section 60 which are selectively connectable together, and which cooperate when assembled to define a pair of opposed vertical grooves 62 therebetween (FIG. 4B) along opposite sides of the stake 16. The grooves 62 function to receive and retain vertical side edges of two adjacent panels 18 therein, when the stake is disposed in the retaining pocket 14 on the trailer.

The stakes 16 can be made from any appropriate material, however, aluminum or aluminum alloys are well-suited for the application. The stakes 16 may be formed by extrusion. Each stake 16 may be an elongated member with a uniform cross-sectional shape, adapted to have a lower portion thereof removably disposed in one of the retaining pockets 14.

As depicted, the inner section 58 of the stake 16 may be a tubular member having a cross-section that is substantially rectangular with a shallow central recess 59 formed in one surface thereof, however other cross-sectional shapes such as round, curved, polygonal, triangular, etc. could be used if desired.

The outer section 60 of the stake 16 may include a substantially flat elongate plate 63 with a pair of spaced-apart ribs 64 projecting transversely from one face thereof, such that outer edges of the ribs 64 engage the central recess 59 of the inner stake section 58 to define the grooves 62, as depicted in FIG. 4B. The side edges of the recess 59 engage the edges of the ribs 64 to help maintain alignment of the inner and outer stake sections 58, 60.

The outer stake section 60 may be provided with one or more upwardly extending hooks 66 extending outwardly from the plate 63 between the ribs 64, and these hooks may be inserted in an appropriate opening 68 formed in the inner section, to connect the inner and outer sections 58, 60 together. The height of the hook(s) 66 may be greater than that of the opening 68, such that the outer section 60 must be disposed at an angle in relation to the inner section 58 for insertion and removal of the hook(s), and when the inner and outer sections are disposed parallel to one another, the hook (s) extend within the hollow of the inner section above the opening 68, to operatively connect the outer section to the inner section.

Also, a projection 70 may be provided on a lower portion of the outer section 60 for preventing lateral movement of the inner and outer sections 58, 60 relative to each other, and relative to the retaining pocket 14 in which a lower end of the stake 16 is disposed. The projection 70 is snugly received by a corresponding opening 72 provided in a lower portion of the inner section.

Aligned openings 74 may be provided in the ribs 64 of the outer section, which receive a pin 100 of the pocket latch 55 therethrough, so that the stake 16 is engaged by the pocket latch, such as shown in FIGS. 5 and 7A, and as previously discussed.

The shape of the outer section 60 of the stake 16 may be modified from that shown the drawings, if desired, so that the outer section may also be engaged by the engaging member 110 of the pocket latch 155 in the second embodiment thereof.

Figure 13A:
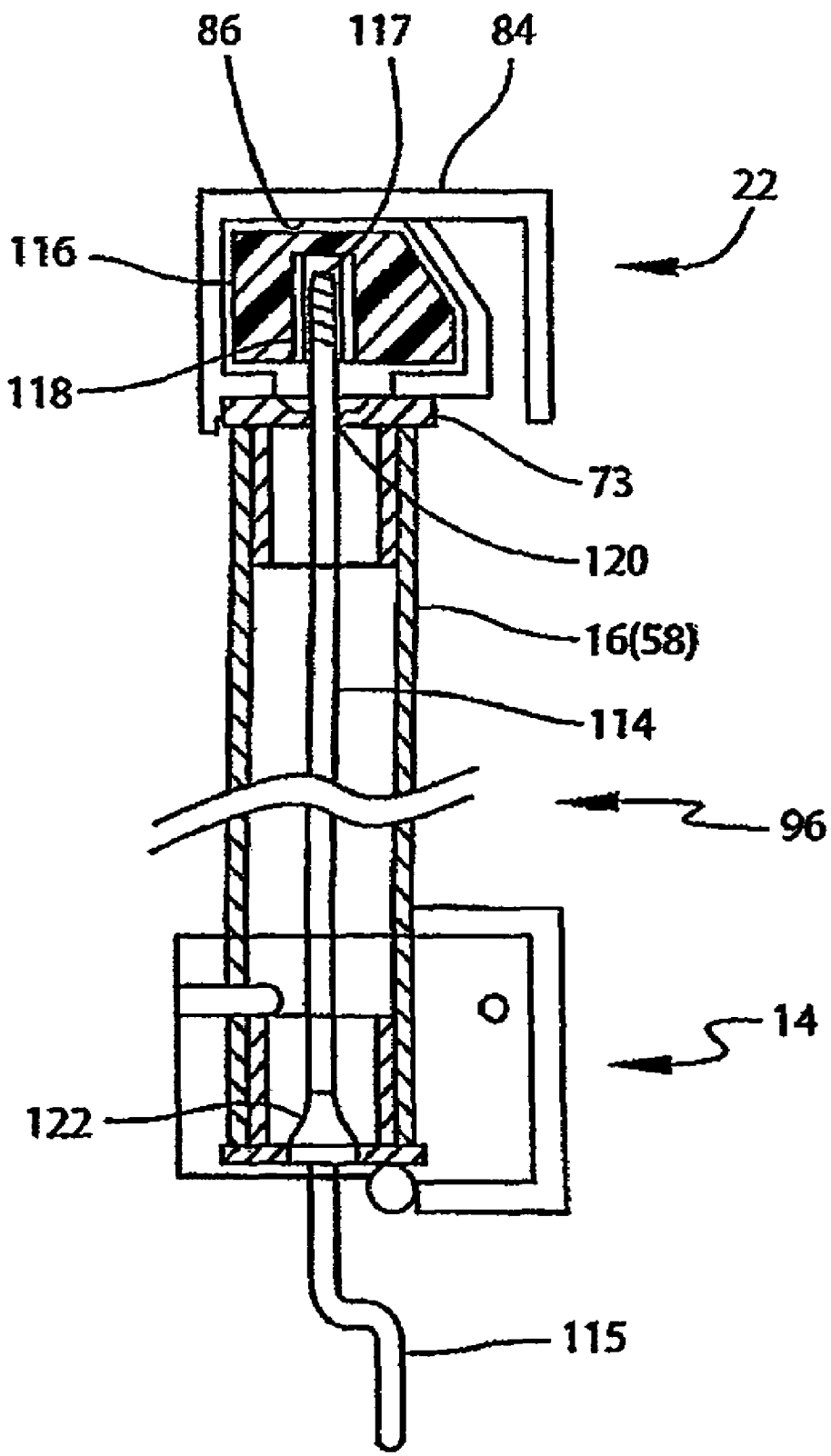
FIG. 13A is a sectional side view of a rail locking mechanism according to an embodiment of the invention, which connects the top rail to the stakes.
Figure 13B:
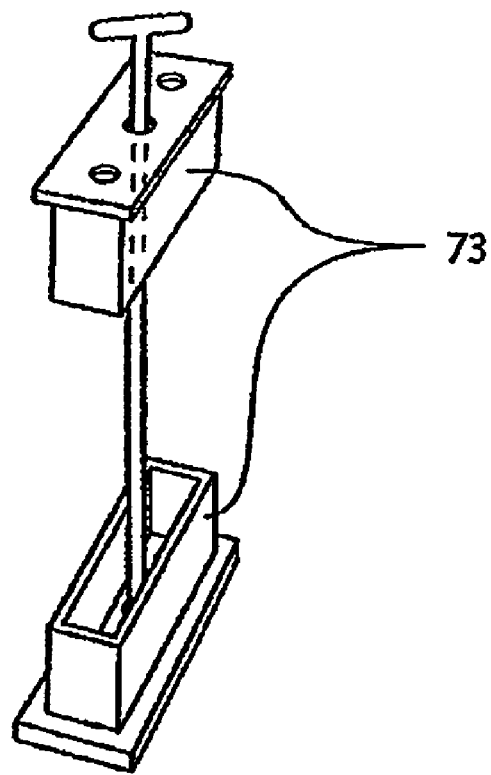
FIG. 13B is a perspective view of a connecting rod extended through a pair of caps, which are provided to be fitted in the ends of a stake.
Figure 13C:
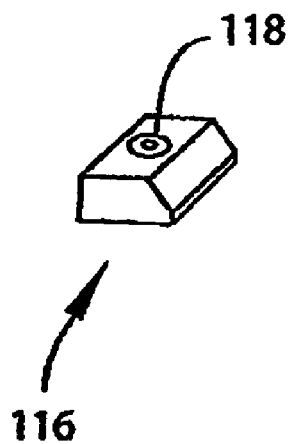
FIG. 13C is a perspective view of a connecting block which is a component of the rail locking mechanism of FIG. 13A.

As shown in FIG. 13A-13B, the stakes 16 may also include caps 73, formed of plastic or other appropriate material, and fitted in the opposite ends of the inner section 58. The caps 73, where used, provide multiple functions, including: sealing the hollow interior of the inner section; receiving the ends of the hooks 66 against the interior thereof to maintain the inner and outer sections in tightly engaged relationship, while preventing the hooks 66 from directly engaging the inner section 58 (which could cause undesirable wearing of the inner and outer sections); guiding portions of a rail locking mechanism, as discussed further below; etc. The caps 73 are relatively inexpensive, and may be easily replaced if/when desired.

The multi-section stake 16 is also an important aspect of the system 10 according to the present invention, representing another significant change from conventional cover systems of this type, in that the multiple-section construction (in combination with the retaining pocket of the invention) permits the stakes 16 and the panels 18 to be conveniently installed and removed by a person standing at ground level adjacent to the trailer.

Figure 4C:
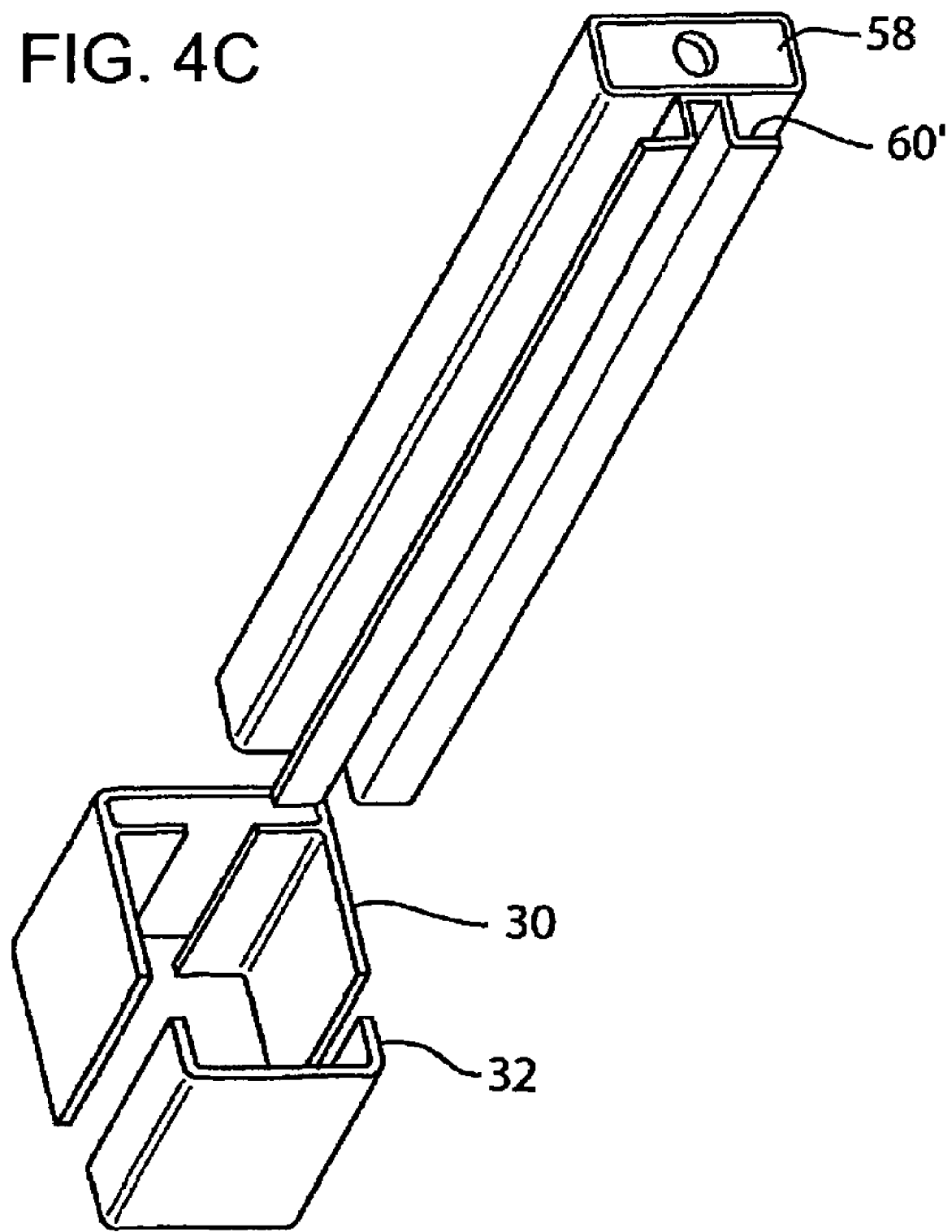
FIG. 4C is an exploded perspective view of another embodiment of a stake and pocket according to the invention.
Figure 4D:
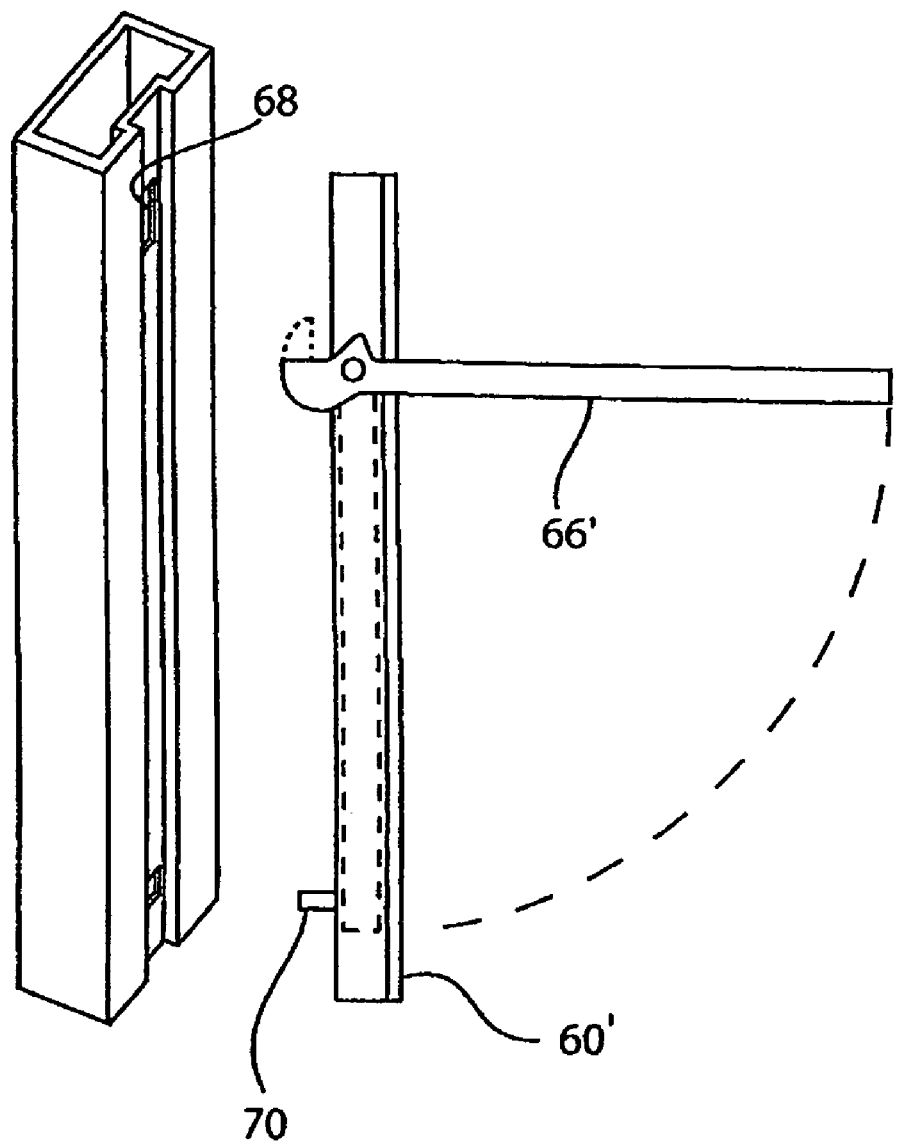
FIG. 4D is a partial perspective and partial side plan view of a two-part stake similar to the stake of FIG. 4A, showing an optional latch mechanism.

While an embodiment of the stake 16 is described above, the invention is not limited to the specifics of such embodiment. For example, the outer section may be configured as a channel-shaped member 60' with a substantially U-shaped cross section as shown in FIG. 4C. Such member may be readily formed by pressing a piece of flat stock, and functions essentially the same as the outer section 60 in FIG. 3. Further, instead of the hooks 66 in FIG. 3, the inner and outer sections of the stake may be connected using a movable connecting member 66' as shown in FIG. 4B. The member 66' extends through and is pivotally connected to the outer section 60', with a short hooked end on one side of the pivot and a longer handle on the other side of the pivot. For attaching the outer section to the inner section, the handle is pivoted away from the outer section, the hooked end is inserted in the opening 68, and the handle is rotated back toward the outer section such that the hooked end is rotated upward to engage the stake inner section. The handle conveniently fits in the central channel of the U-shaped outer section when the stake sections are connected together Sidewall Panels As previously noted, the stakes 16 are provided to support and interconnect a plurality of panels 18. The panels 18 are generally rectangular in shape, and may be made from any flat rigid material including plywood, fiberglass, polymers, foams, sheet metal, composites, or any combination of these. The panels 18 are made in a suitable thickness to fit snugly into the vertical grooves 62 of the stakes 16. If constructed of lightweight materials, such as open-celled foam with inner and outer aluminum skin bonded thereon, the panels 18 are easier to manipulate and are more fuel-efficient to use.

The height of the panels 18 may be somewhat greater than the width thereof, although this is not required. Further, the panels 18 may have different lengths or other dimensions if desired, but if the panels have identical sizes, this allows for interchangeability and standardization of manufacture. Still further, the panels 18 could be formed of flexible fabric or tensioned flexible fabric mounted on an appropriate frame, such as a frame formed of extruded aluminum. Such a panel would be very lightweight. Optionally, the panels 18 may be provided with handles (not shown) on the bottom thereof, and where used, such handles may be provided as either straps attached to the panels, or openings formed in the bottom of the panels to receive a hand of a user therein. As another optional feature, an upper horizontal edge of each of the panels 18 may be reinforced with a reinforcement member 19 extending over the panel on three sides thereof, as shown in FIG. 15.

Figure 11A:
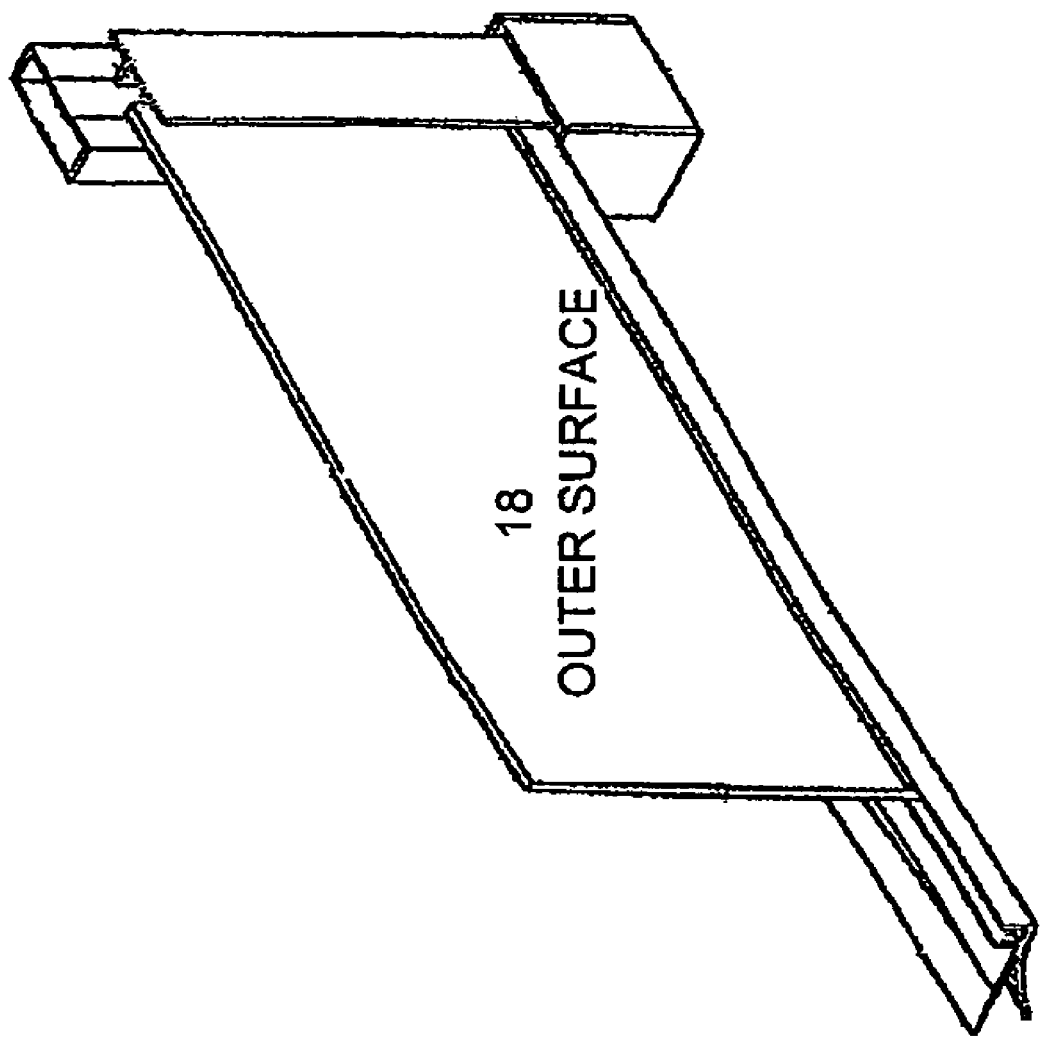
FIG. 11A is a perspective view of selected components of the system hereof, including a seal, a panel, a pocket, and a stake, shown from a vantage point outside of the trailer.
Figure 11B:
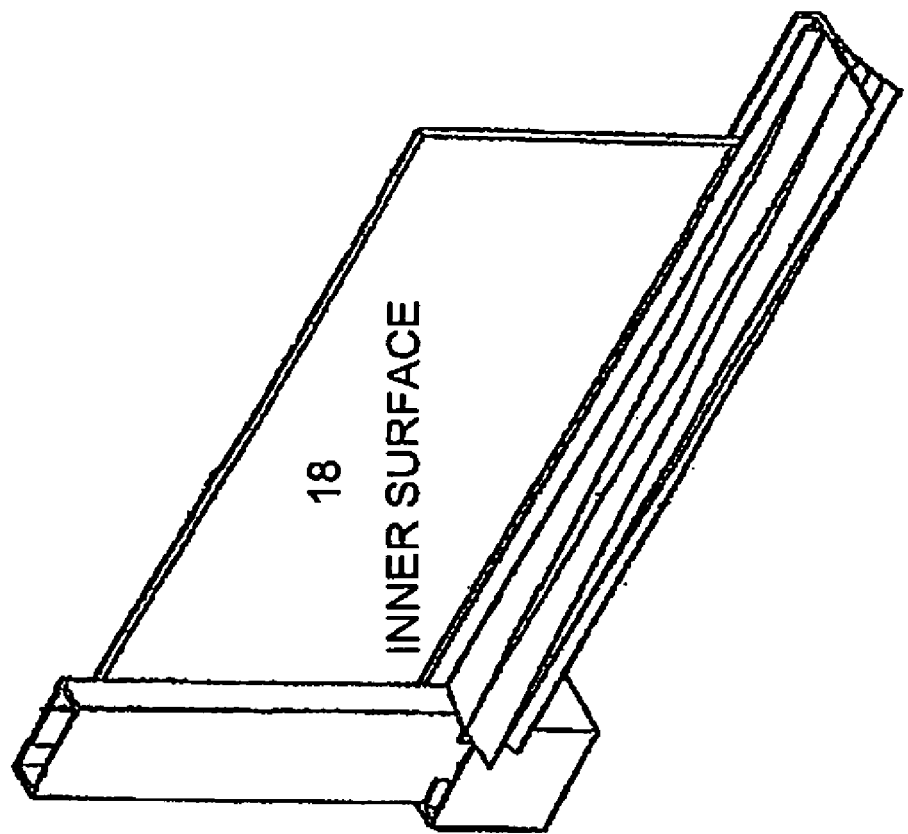
FIG. 11B is a perspective view similar to FIG. 11A, shown from a vantage point inside of the trailer.
Figure 11C:
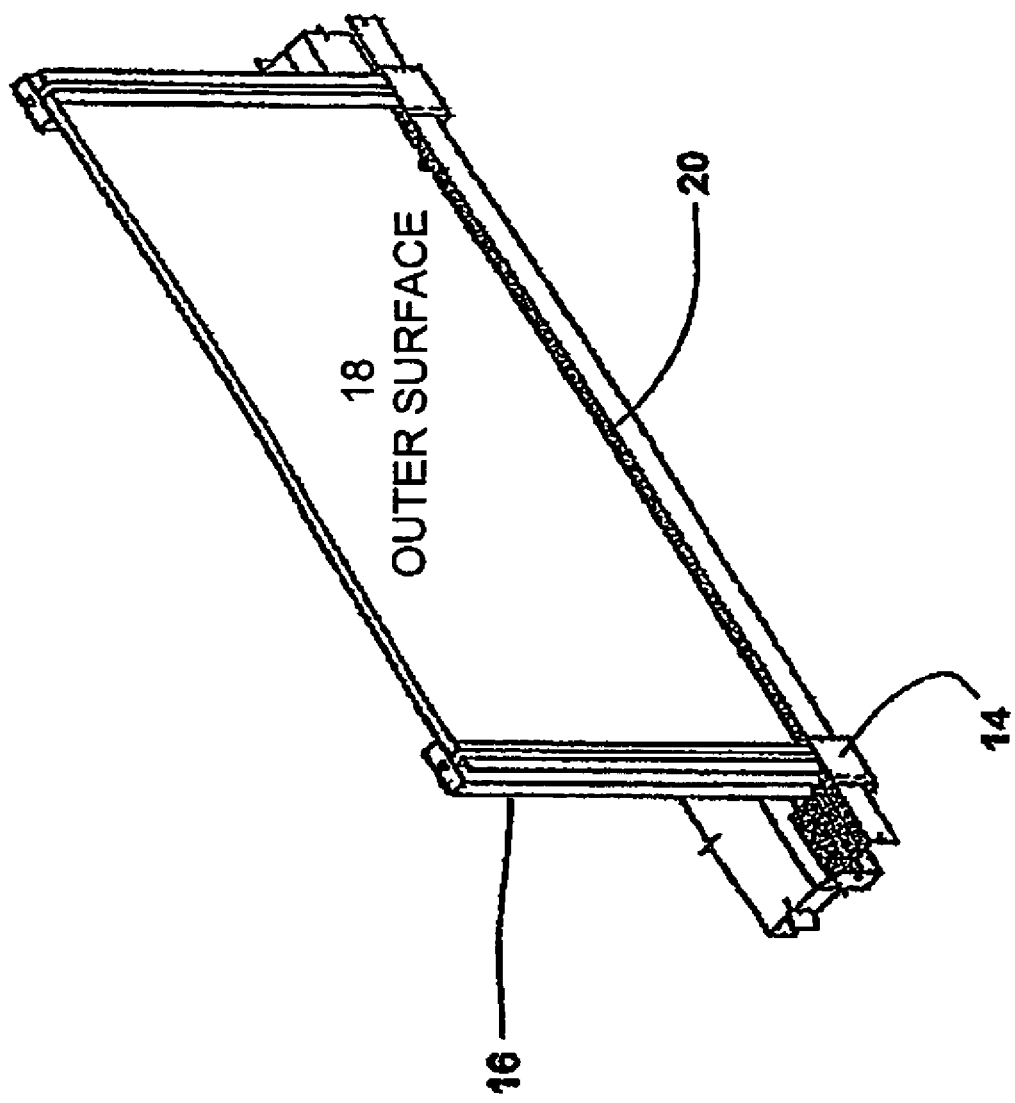
FIG. 11C is a perspective view of a panel supported between a pair of stakes on a portion of the flatbed trailer, together with the sealing member, shown from a vantage point outside of the trailer, and showing an alternate embodiment of the stakes.

According to an important aspect of the inventive cover system 10, when the system hereof is assembled on a truck trailer 12, the panels 18, as supported by the stakes 16 and retaining pockets 14, are disposed away from the trailer 11 at the outside of the retaining pockets 14, such that the outer surfaces of the panels 18 are substantially flush with the outer surfaces of the stakes 16, as shown in FIGS. 11A-11C, and as discussed further below. This presents a substantially smooth and aerodynamic exterior trailer surface, for improved efficiency and fuel economy during over-the-road travel of the trailer 10.

Correspondingly, it is desirable to provide some additional support for the bottom edges of the panels 18 besides the upper edges of the pocket side walls 36, 37, which have a relatively small surface area. For such purpose, as shown in FIGS. 2B and 5, a pair of integral support brackets 50 may be provided longitudinally extending from, and attached to the side walls 36, 37 of the retaining pockets 14. As depicted, the brackets 50 may be attached between sides of the trailer 12 and pocket side walls, e.g., via welding. The brackets 50 include flat upper surfaces 52 on outer portions thereof, for supportively contacting lower edges of the panels 18, and inner portions 54 which slope downwardly toward the trailer so as to avoid interference with the seal members 20 (discussed further below).

The brackets 50 may be constructed other than shown. For example, they could be formed integrally with the retaining pockets, they could have a different shape or size from that depicted, etc.

As an alternative or additional support for the panels 18, an outer protective rail 56 (FIG. 10) may, optionally, be disposed such that its upper surface is at a level and disposition to support the bottom edges of the panels.

Method of Disassembling System

As previously discussed, in prior art cover systems, conventional stakes make it difficult to manually install and remove the stakes and the associated panels relative to a flatbed trailer or the like. In contrast, with the stake 16 and retaining pocket 14 of the present invention, the following convenient procedure may be used for removing the stakes and panels from a trailer.

Initially, the truck is parked in a secure location, such as adjacent a loading dock. Then, the pocket latch 55 or 155 is released, and the movable section 32 of the retaining pocket 14 is manipulated to move it to the open position thereof. The outer section 60 of the stake 16 is then removed or detached from the inner section 58 thereof, which creates a gap between opposing vertical edges of a pair of the panels 18, corresponding to the space between the ribs 64 of the outer section 60.

One of the exposed panels 18 may then be removed by sliding or displacing it longitudinally to close the gap until it abuttingly contacts an edge of the adjacent panel 18. This longitudinal movement of the panel 18 removes the opposite vertical edge of the displaced panel from a recess 62 of an associated stake, whereupon the displaced panel is no longer secured by any post, and can be manually pulled off or down from the trailer.

The other panel can then be removed in like fashion, and a similar process can be applied for removing other stakes and panels of the system, as desired, to access the contents of the trailer. For mounting the stakes and panels to the trailer, a reverse process is applied.

Although the multi-section stake and the multi-section retaining pocket of the invention function very advantageously in combination, as discussed above, the stake could (of course) be used together with a conventional, non-moving pocket. In such case, it would be necessary to lift the lower portion of the stake out of the retaining pocket before the sections of the stake could be separated. Alternatively, a one-piece stake could, if desired, be used with the inventive pocket 14 according to the invention.

Again, another important aspect of the invention is the disposition of the panels 18 such that the outer surfaces thereof are disposed away from the trailer at the outside of the retaining pocket, and substantially flush with the outermost surfaces of the stakes, as shown in FIGS. 11A-11C. In this arrangement, the stakes project outwardly of the panels only by the width of the outer wall 60 thereof. This advantageously provides the cover system with a relatively smooth and aerodynamic outer surface, unlike the conventional systems where the stakes project significantly outwardly from the panels. As a result, the system according to the present invention improves aerodynamic characteristics and improved aesthetic appearance of the trailer.

Further, the outward disposition of the panels 18 in the present invention effectively creates additional covered cargo storage space in comparison to conventional systems. For example, in comparison to conventional systems, in which the panels are supported on or directly adjacent to the trailer, the panels of the present invention may be spaced outwardly from the trailer by approximately two-three inches while still meeting the same government regulations on vehicle width as the conventional systems. For a trailer which is forty feet long and a cover system which is six feet high, this effectively creates additional usable storage space within the trailer, e.g., 40-80 cubic feet, as compared to a conventional cover system.

Still further, this reduces the possibility of interference between the panels and cargo support straps and chains, which are typically anchored below the trailer bed, and extend around and over the edge of the trailer bed to secure the cargo.

Figure 4E:
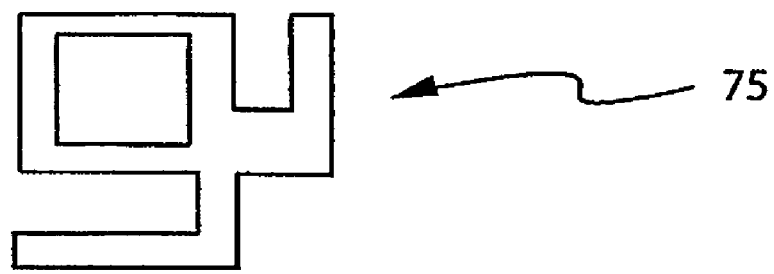
FIG. 4E is a plan sectional view of an embodiment of a corner stake according to an embodiment of the invention.

At the junctions between the two sides of the trailer and the rear end of the trailer, it is possible to use a corner stake 75 which includes a pair of panel-receiving recesses extending at a right angle to each other, i.e., one recess facing parallel to the side of the trailer and the other recess facing parallel to the rear of the trailer. A cross section of such a corner stake 75 is shown in FIG. 4E. The lower portion of the stake 75, that fits in the retainer pocket, may have a different shape from that in FIG. 4E, e.g., the section of the stake defining the recess facing parallel to the side of trailer could be eliminated, so that the lower portion fits in a retaining pocket 14 shaped the same as the other pockets.

Seal Member

Figure 8:
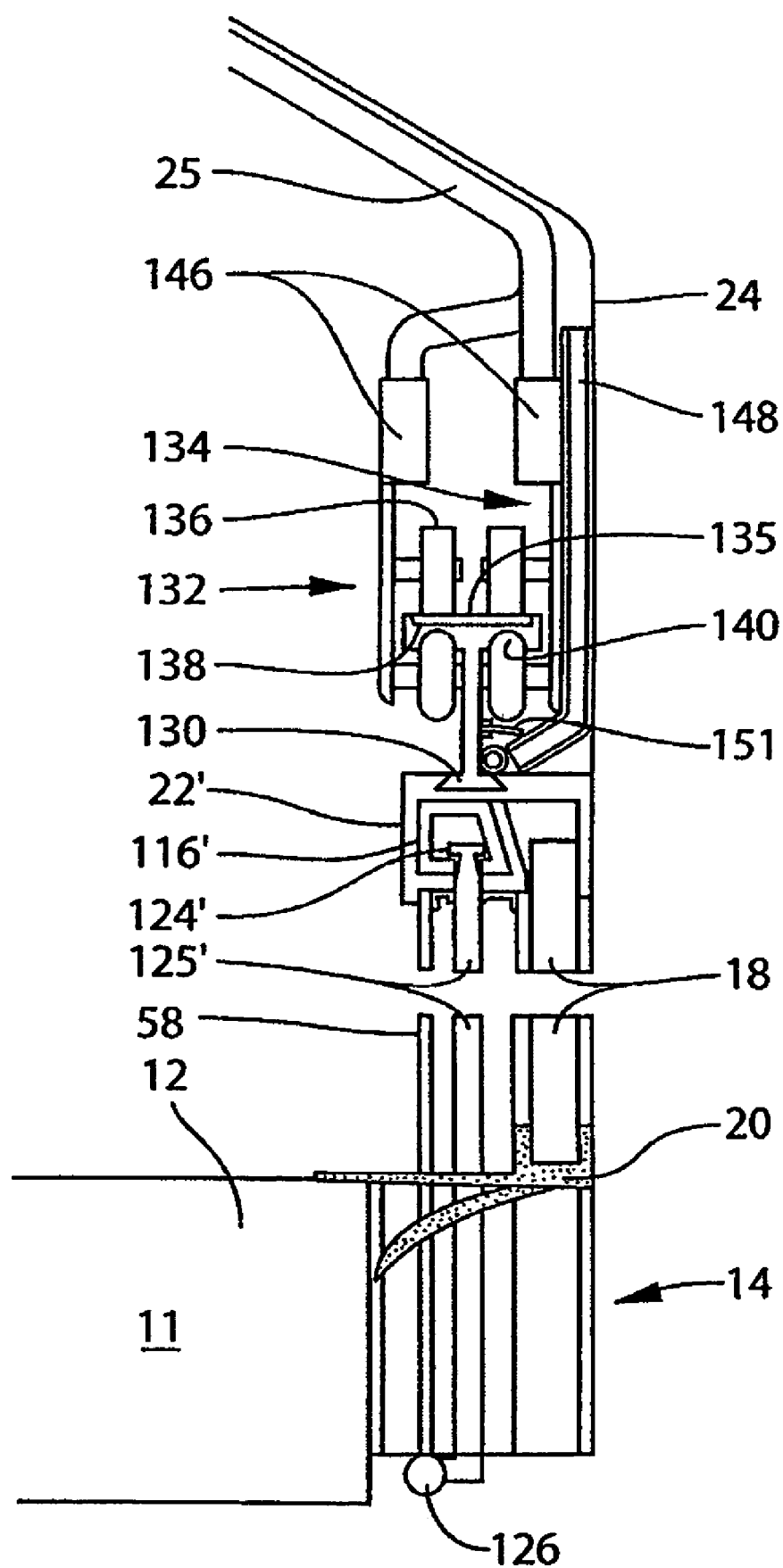
FIG. 8 is a sectional view showing a side portion of a trailer bed and cover system according to an embodiment of the invention.
Figure 9:
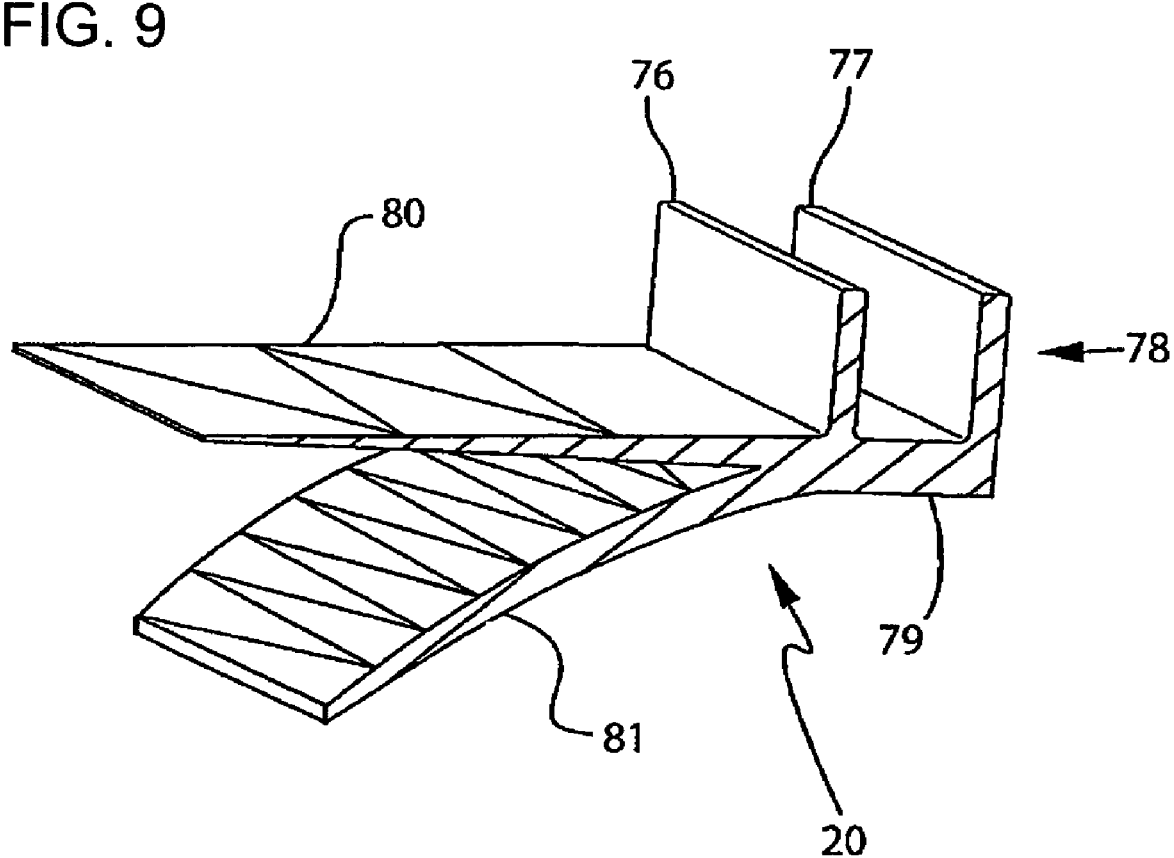
FIG. 9 is a perspective view of a sectional piece of a sealing member according to an embodiment of the invention.

With reference to FIGS. 1 and 8-11B, the seal members 20 of the system 10 are configured and arranged to seal the spaces or openings defined between the lower edge portions of the panels 18 and the trailer bed 11. Sealing of this area is important, given that the panels 18 are disposed at the outside of the retainer pockets 14, and significantly spaced away from the trailer, as discussed above. Although only a thin section of a seal 20 is shown in FIG. 9 for simplicity of illustration, the seal members 20 are intended to be approximately as long as the panels 18, and one seal member is disposed along the entire length of the bottom edge of each panel. Thus, the sealing members 20 extend substantially completely around the two sides and the rear of the trailer, except at a central portion of each stake 16, corresponding to the disposition of the panels.

Figure 10:
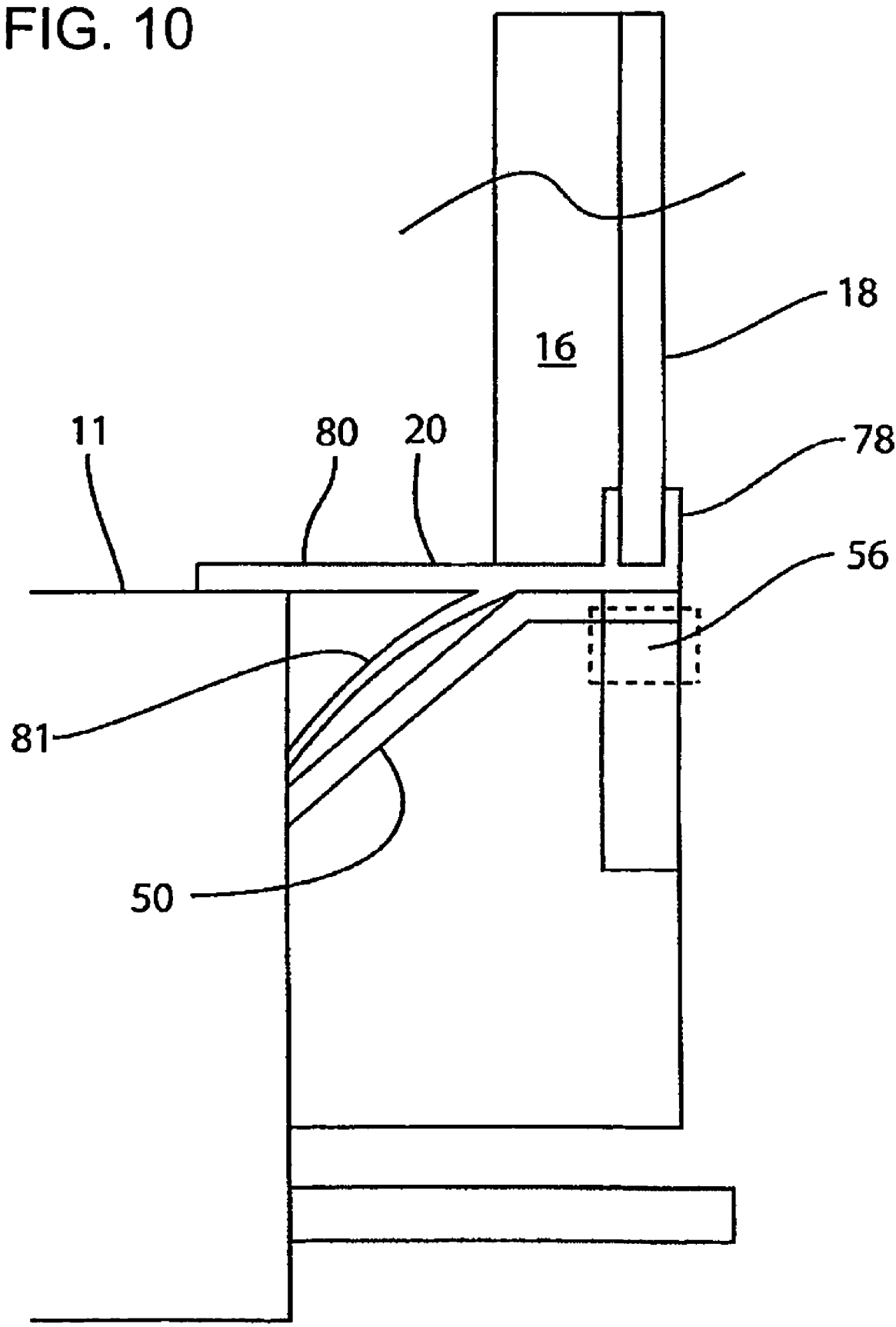
FIG. 10 is a side view of the sealing member of FIG. 9, installed between a panel and trailer bed of the system hereof and disposed to seal a space between the bottom edge of the panel and the flatbed trailer.

Referring now to FIGS. 9 and 10, it will be seen that the seal member 20 may include a panel-engaging portion 78 including two spaced-apart vertical flanges 76, 77 interconnected by a bridge portion 79, and first and second trailer-engaging portions 80, 81. As shown, the first trailer-engaging portion 80 may be adapted to engage the upper surface of the trailer bed 11, while the second trailer-engaging portion 81 may be adapted to extend diagonally downward from the first member to abuttingly contact the side surface of the trailer bed. This is advantageous for forming an effective seal against water, dirt and other foreign matter.

The seal 20 is also an important aspect of the system 10 according to the illustrative embodiment, especially when considered together with the outward disposition of the panels 18 relative to the trailer 12, because it reduces or eliminates the disadvantageous gaps conventionally formed between the panels and the trailer. The seal member 20, being flexible, also helps to maintain its sealing function during movement of the trailer, while accommodating flexing movement of the trailer bed 11.

The seal member 20 can be permanently bonded or attached to the panel 18, e.g., using adhesive or fasteners, to reduce the possibility of the seal detaching therefrom during handling or transit, or otherwise becoming lost. However, the seal member 20 could alternatively be detachably connected to the panels, if desired, e.g., via friction or snap fit of the panel-engaging portion 78 around the bottom edge of the panel. If desired, the panel-engaging portion 78 may include a plastic insert (not shown) made of a harder material than the rest of the seal 20.

The seal can be made from a rubber material, a strong reinforced silicone elastomer, or other water-resistant elastomeric or flexible material. While other materials could be used if desired, flexible materials such as rubber and elastomers provide excellent sealing characteristics, and the seal member 20 cooperates well with any load securing straps or chains that may be needed to pass between the flatbed and the seal member.

While an embodiment of the seal member 20 is discussed above, it will be understood that variations may be made thereto. For example, the seal member need not be operatively attached-engaged to the panel, but may instead be operatively engaged-attached to the outer protective rail 56, if such a rail is used to support the panels. Further, the particular shape of the seal member 20 may be modified as desired, as long as the sealing function is maintained, e.g., the panel-engaging portion may be other than U-shaped in section, the second trailer-engaging portion could be made smaller or in a different shape, one or any other number of trailer-engaging portions could be used instead of two, etc.

Rails and Rail Locking Mechanism

With reference to FIGS. 1, and 12A-12C, there are shown support rails 22 disposed above the stakes 16 at the sides and rear end of the trailer. With further reference to FIGS. 13A-14C, there are shown two embodiments of a rail locking mechanism 96 according to the invention, and either one of these rail locking mechanisms may be used to connect the rails 22 to the stakes 16 and to the pockets 14.

As shown best in FIG. 1, the rails 22 extend longitudinally along the sides of the trailer, and may be formed in multiple sections, e.g., two longer sections extending most of the trailer's length, and a short section at the front of the trailer adjacent the headboard 26. Alternatively, the rails 22 could be formed in shorter lengths corresponding to the length of the panels 18, or any other or various lengths if desired. The rail section 22 extending along the rear of the trailer may be formed in a single section as shown.

The rail sections 22 can be disconnected from the stakes 16 and removed, as needed, when the trailer is parked in a secure location. Because trailers flex and move during use, so as to be temporarily shaped concave or convex in the longitudinal direction, gaps 23 (FIG. 1) may be provided between opposing faces of the rail sections 22, to accommodate such movement.

Figure 12A:
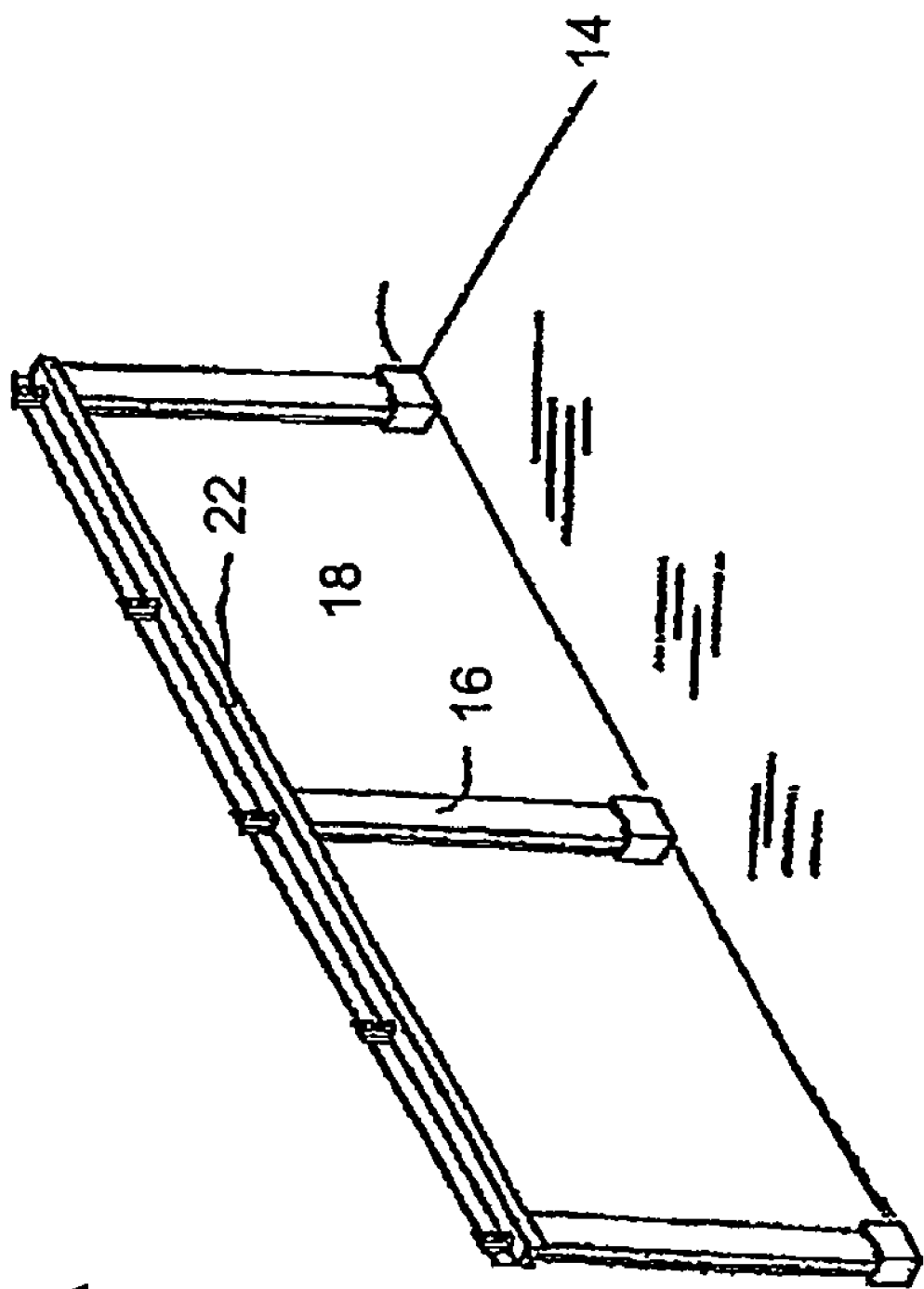
FIG. 12A is a perspective view of a plurality of stakes supported in retainer pockets according to an embodiment of the invention, shown from a vantage point inside of the trailer, and with a section of a top rail shown extending above the stakes.
Figure 12B:
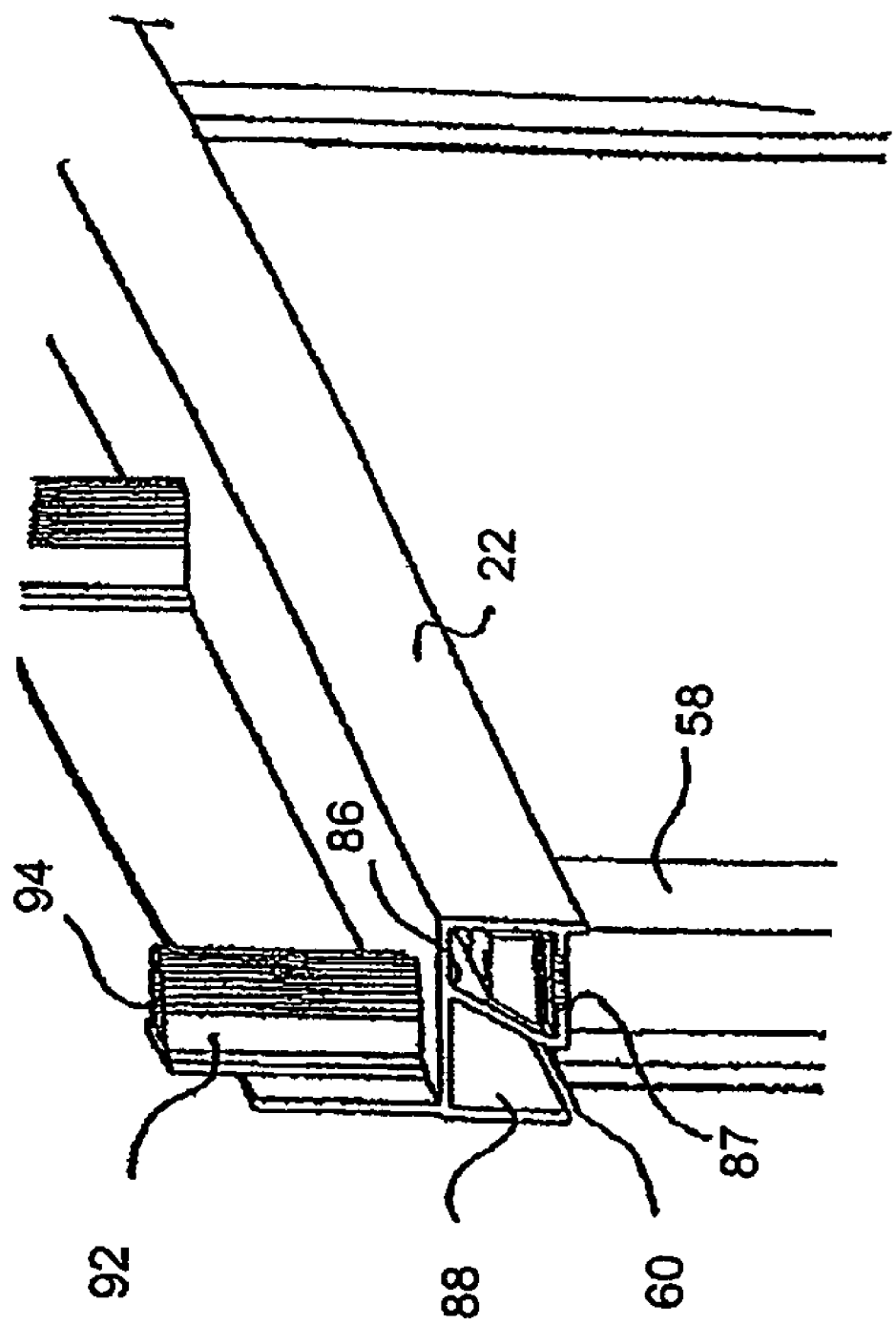
FIG. 12 B is a detail perspective view of an enlarged portion of FIG. 12A, showing an end portion of a rail section and part of a locking structure.
FIG. 12C is a perspective view of a short segment of the top rail according to an embodiment of the invention.
FIG. 12D is a view of a number of assembled stakes and a top rail similar to FIG. 12A, shown from a vantage point outside of the trailer.
Figure 12C:
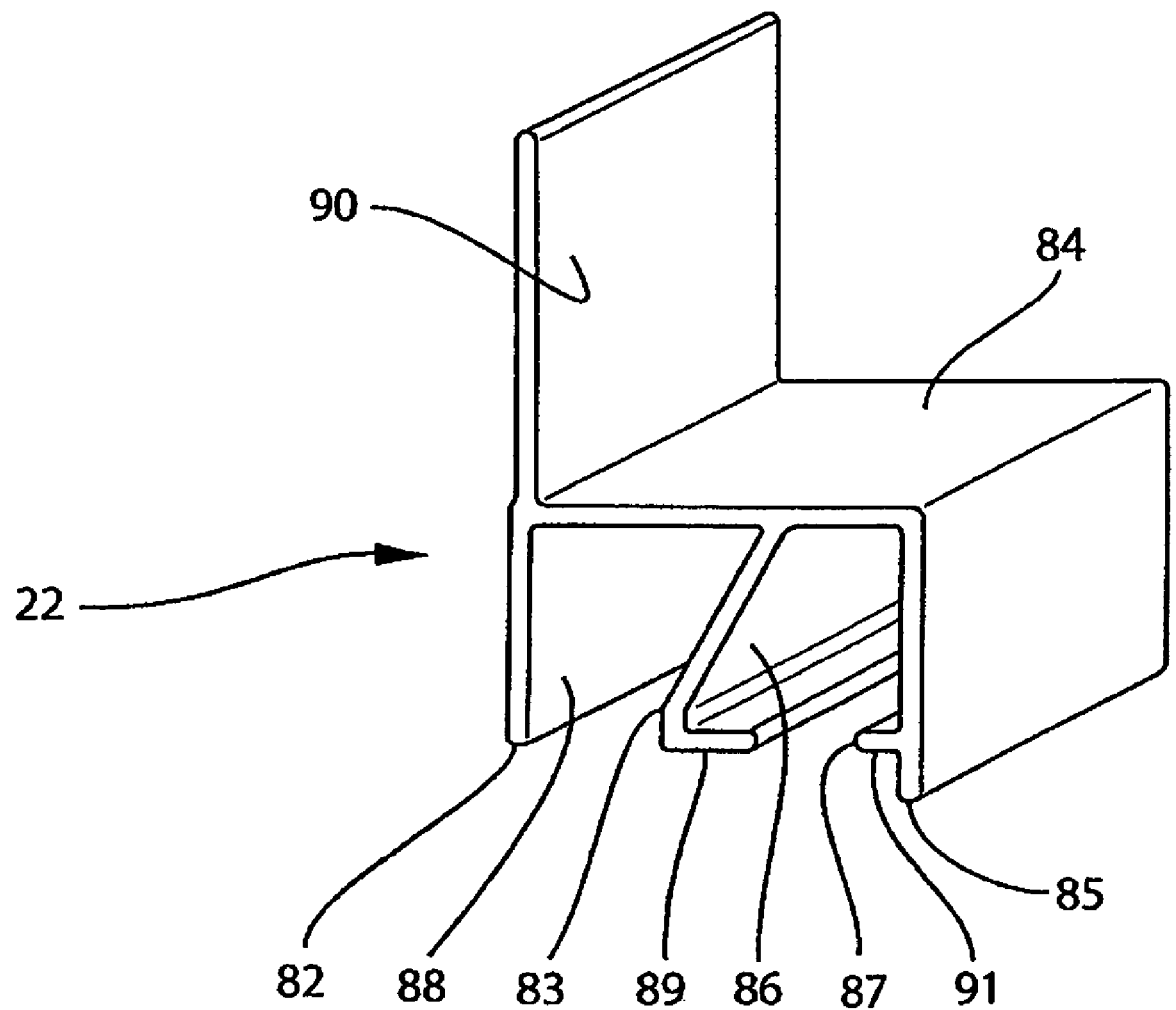
Figure 12D:
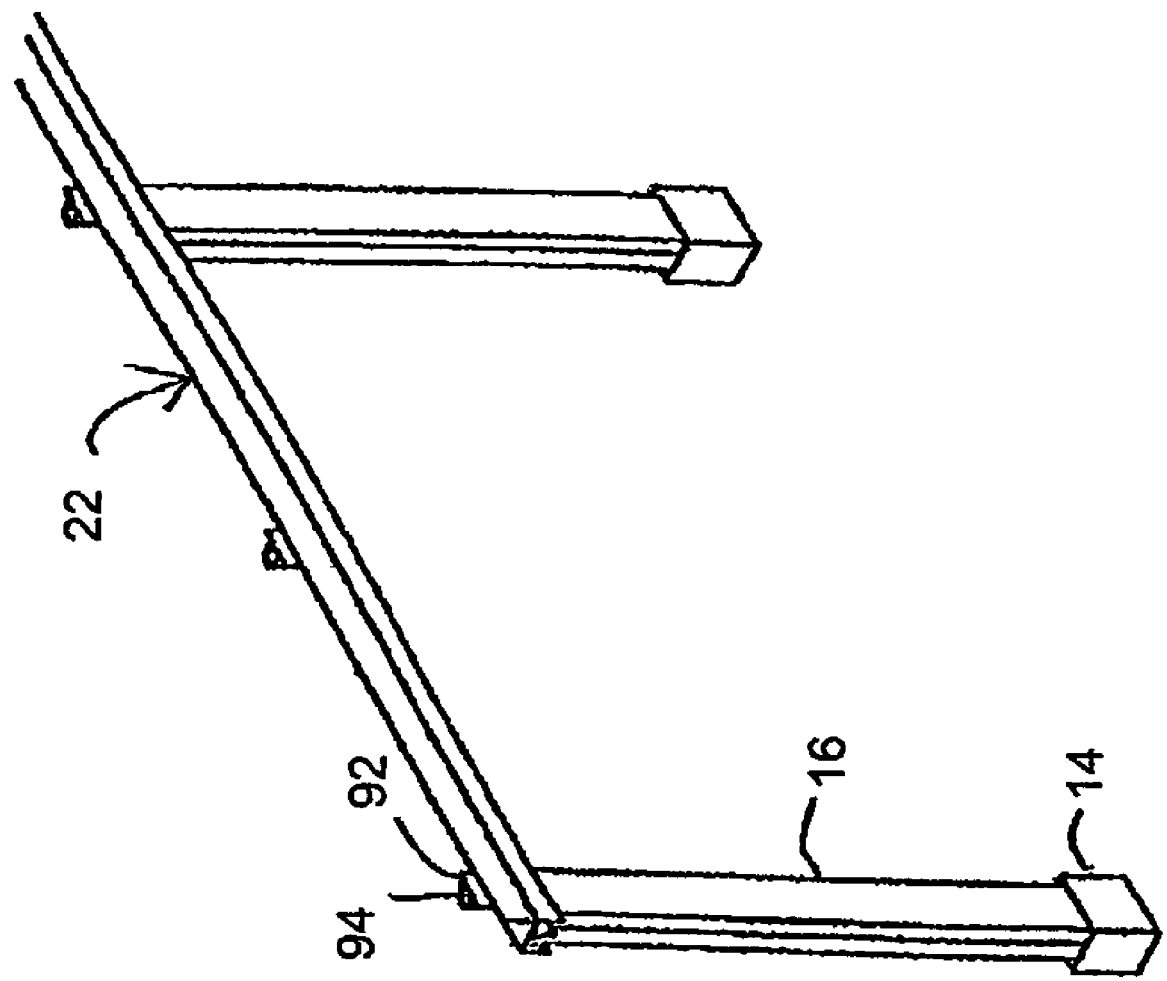

The rail sections 22 may be formed of any appropriate material(s), such as extruded aluminum, plastic, etc. and may have a cross sectional shape as shown in FIG. 12C, including a horizontal plate section 84, three downwardly depending walls 82, 83, 85 which define inner and outer channels 86, 88 inside of the rail. Two of the adjacent depending walls 83, 85 may include parallel horizontal flanges 89, 91 extending toward one another at lower edge portions of the depending walls 83, 85, as shown, such that the parallel flanges define a slot 87 therebetween. Optionally, in the embodiment shown in FIG. 12C, the rail sections 22 may also include an upwardly extending top wall 90.

Also, as shown in FIG. 12B, a plurality of bow end supporting members 92, formed of plastic resin, metal, composites, or other appropriate material, may be provided in spaced relation along the rail 22. In one embodiment of the system 10, these bow end supporting members 92 may be fixed to the top wall 90 and/or the horizontal plate section 84 using an appropriate bonding agent, fastener, etc.

The bow end supporting members 92 may each have an opening or recess 94 formed in the upper surface thereof that is adapted to securely receive therein a terminal end portion of a cover-supporting bow 25 therein, such that the bows may be operatively connected to the rails 22 through the bow end supporting members 92. The bow end supporting members 92 may be provided in any desired spacing along the rails, and need not specifically align with the stakes 16, unlike in conventional systems where the bows are supported by the stakes and must be aligned therewith.

The inner channel 86 of the rail 22 may have a substantially trapezoidal cross sectional shape with the slot 87 defined centrally along a bottom horizontal wall thereof, while the outer channel 88 may have a substantially trapezoidal cross sectional shape with a completely open lower end, as depicted. The bottom wall of the inner channel 86 may engage the upper end of the inner section 58 of the stake 16, and the stake may be connected to the rail 22 at the inner channel 86 via the rail locking mechanism 96 according to the invention, as discussed further below.

As shown in FIG. 15, an upper horizontal edge of the panel 18 may extend within a lower portion of the outer channel 88 during normal use of the cover system 10, while an inner wall 83 of the outer channel 88 may be tapered inwardly, such that the upper portion of the channel 88 has a greater width than the lower portion thereof. (Optionally, as noted above, the upper horizontal edge of the panel 18 may be reinforced with a reinforcement member 19 extending over the panel on three sides thereof, as shown.) With such construction, after the stakes 16 have been removed, the upper edge of the panel 18 may be raised further within the channel 88 to contact the bottom of the upper plate section 84, and then the lower portion of the panel may be conveniently swung outwardly away from the trailer, to orient the panel 18 in the angled configuration shown in phantom in FIG. 15, which greatly facilitates installation and removal of the panel by persons standing on the ground adjacent to the trailer.

With reference to FIGS. 12B and 13A, a first embodiment of the rail locking mechanism 96 for connecting the rail 22 to the stake 16 and the pocket 14 according to the invention will now be described. As depicted, the rail locking mechanism 96 may include an elongate connecting rod 114, which extends from a handle portion 115 at the bottom of the pocket 14 through the stake 16, and ends with a threaded tip 117 disposed in the rail 22. A lower portion of the rod 114 may extend through an opening defined in a bottom wall of the pocket 14, and an enlarged lower end of the rod may be sized so that it cannot pass through the opening in the pocket bottom wall. At the top of the rod 114, a connecting member or block 116 is disposed within the inner channel 86 of the rail 22, and this block may include a threaded female nut member 118 therein for receiving, and being connected to the threaded tip 117 of the rod 114.

The connecting rod 114 may be formed of steel, a metal alloy, or other appropriate material(s), while the connecting member 116 may be formed of plastic or other appropriate material(s). A segment of the connecting member 116 is shown in perspective view in FIG. 13C. The connecting member or block 116 may extend the full length of the rail 22 within the inner channel 86, having an appropriate number of openings formed therein for being connected to a plurality of the stakes 16. Most of the connecting rod 114 may extend through the stake inner section 58, such that it is normally concealed from view. The lower of the connecting rod 114 may have an appropriate tool engagement fitting formed therewith or provided thereon, e.g., a slot or recess to receive a screwdriver head, a hexhead tool or the like, for being rotated by such tool, and the upper end of the rod may have a threaded tip 117, which may be securely received in a threaded opening formed in the connecting member 116, and then spun to tighten the connecting member 116 and the rail 22 downwardly against the top of the stake 16.

With such construction, the rail locking mechanism 96 of the invention may be used to readily connect the rails 22 very securely and tightly to the stakes 16 and pockets 14, and to similarly disconnect these components as appropriate, by a person standing on the ground adjacent to the trailer. Particularly, the connecting rod 114 may be extended upwardly through the opening in the bottom wall of the pocket until the threaded upper end thereof engages the threaded opening in the connecting member 116. Then, the rod 114 may be rotated with an appropriate driving tool engaged with the rod's lower end, until the threaded upper end of the rod is securely threaded into the member 116. As the rod is rotated more and more, the connecting member engages the bottom wall of the rail inner channel 86, thereby drawing the rail 22 into very close and tight contact with the upper end of the stake 16, which is in turn tightly secured to the pocket 14.

This discussed connection between the rails 22, stakes 16 and pockets 14 via the rail locking mechanism 96 is another important aspect of the system 10 in comparison to conventional cover systems including stake-supported panels, which (again) do not include any component corresponding to the rails 22 of the present invention. For example, the connection assures that there is little or no play between the stakes, pockets and rails, which desirably reduces movements and vibrations of the components during travel, which reduces associated wear and noise, and again, the connection may be effected by a person standing on the ground adjacent to the trailer.

If the connecting member 116 is formed of plastic or plastic foam, it is not only inexpensive to manufacture and lightweight, it also prevents direct contact between the connecting rod 114 and the rail 22, which is desirable to prevent rapid wear of the rail, especially if the rail is formed of aluminum and the rod is formed of steel. The connecting member 116 may have the threaded opening(s) formed directly therein, but could alternatively have threaded insert(s) 118 formed of steel or other appropriate material glued or otherwise fixed within a non-threaded opening formed in the connecting member 116. Also, a lower portion of the insert 118 or of the opening, where an insert is not used, may, optionally, have a tapered shape, to facilitate insertion of the upper threaded end of the rod 114.

The caps 73 provided in the ends of the stakes 16 may have openings 120 defined therein through which the rod 114 may pass, while a seal 122 may be provided in conjunction with a lower end of the rod 114 to prevent water and other foreign matter from entering the lower end of the stake.

Figure 14B:
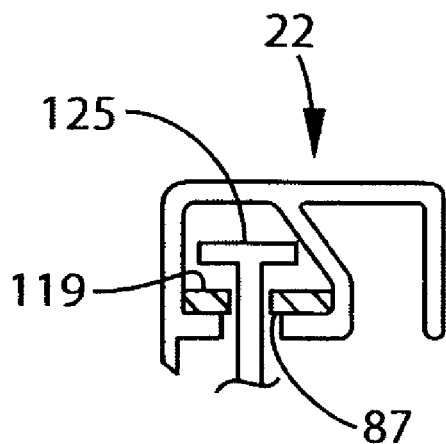
FIG. 14B is a detail side view of an upper portion of the rail locking mechanism of FIG. 14A, showing the T-shaped upper end in a second position thereof.
Figure 14A:
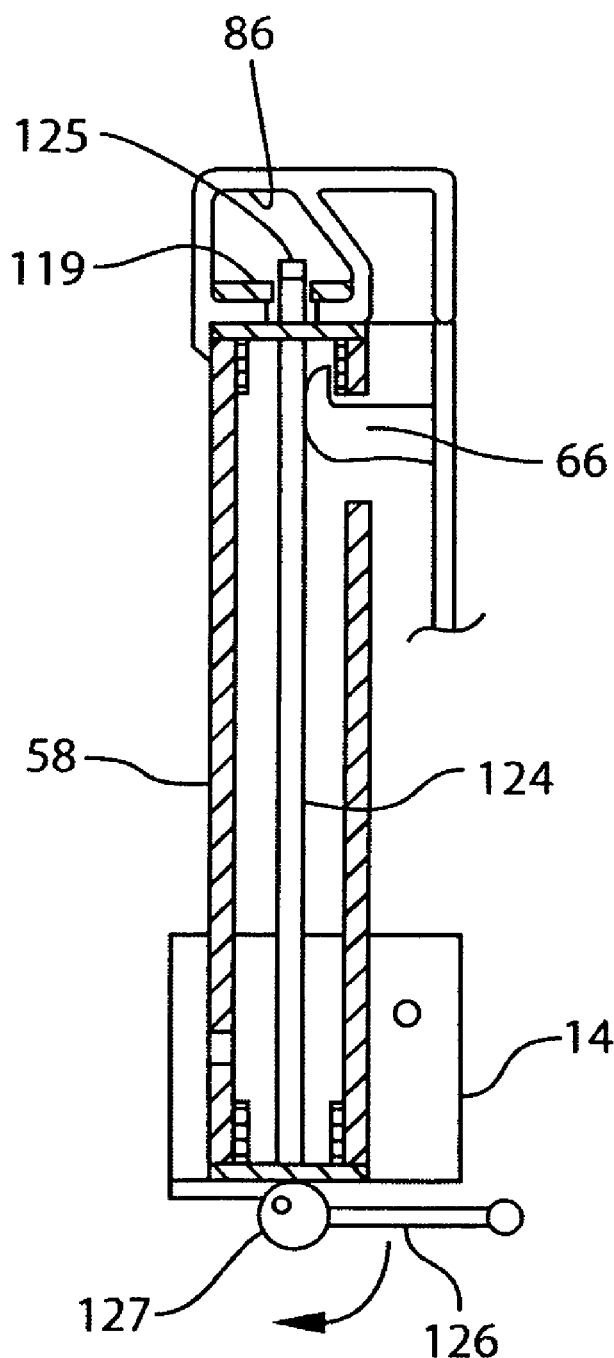
FIG. 14A is a sectional side view of an upper portion of the stake and a rail locking mechanism according to another embodiment of the invention, with a T-shaped upper end shown in a first position thereof.
Figure 14C:
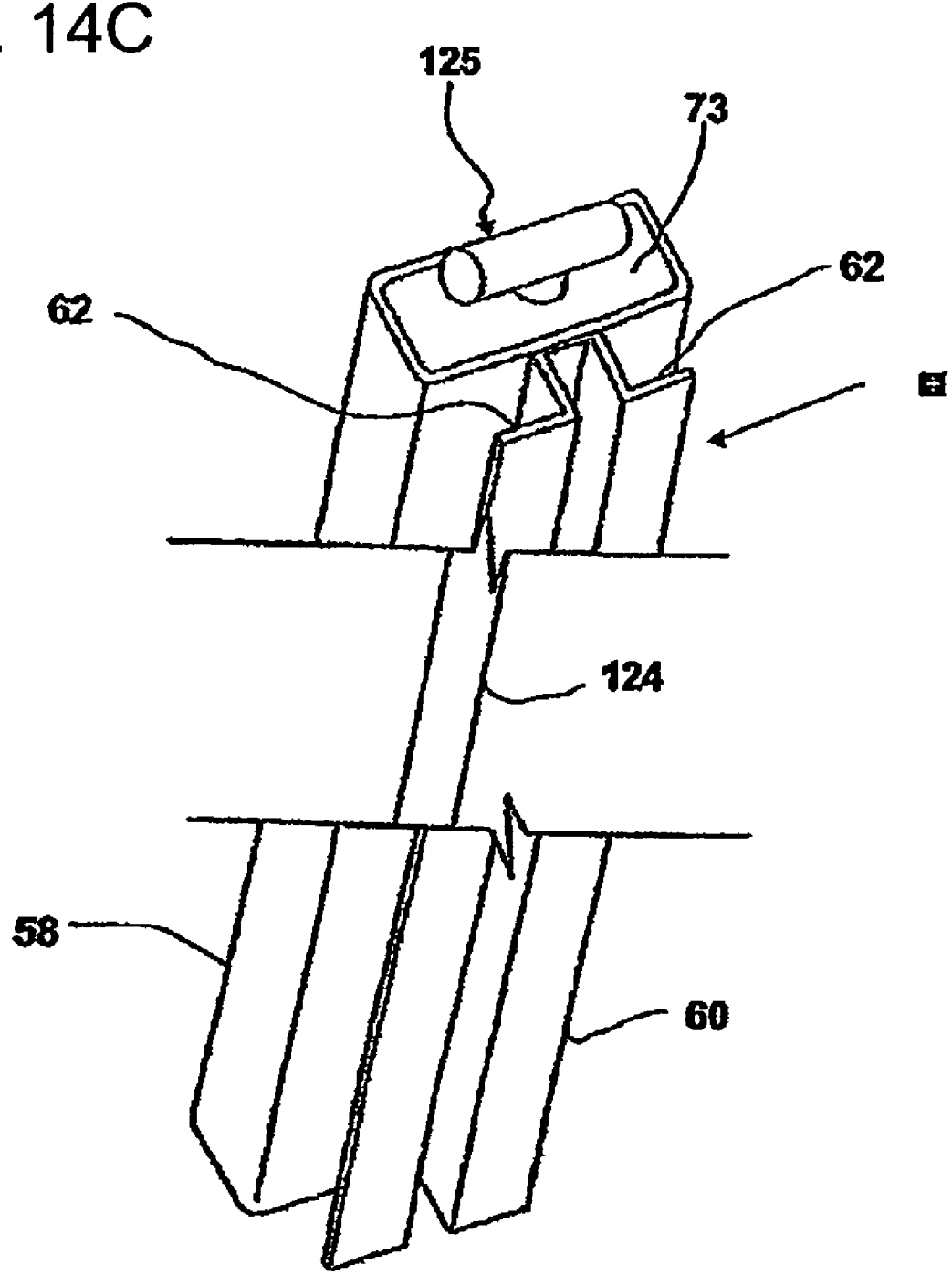
FIG. 14C is a perspective view, partially cut away, of an upper portion of the stake and the T-shaped upper end of the rail locking mechanism of FIG. 14A.
Figure 14D:
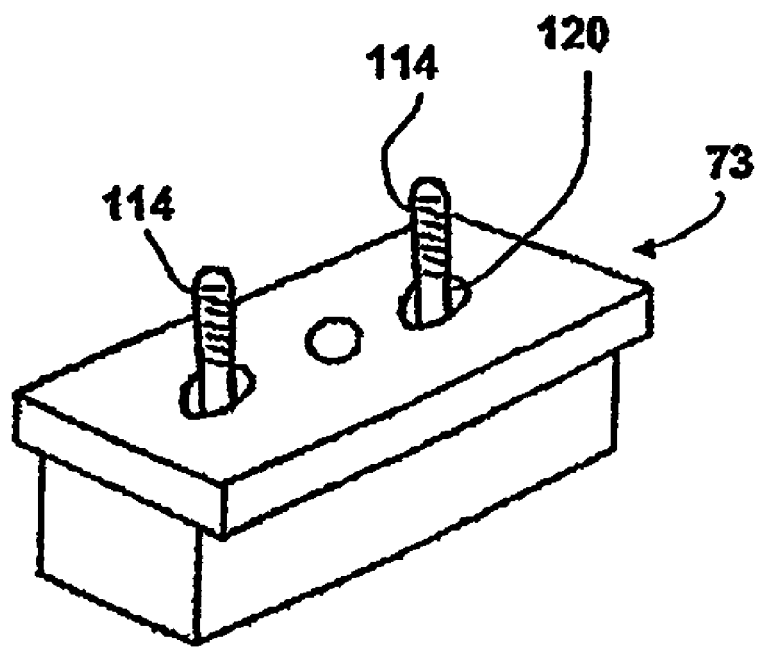
FIG. 14D is a detail perspective view of an end cap with two threaded rods of a rail locking mechanism extending outwardly therefrom.

As depicted in FIGS. 1 and 14D, adjacent ends of two abutting sections of the rails 22 may be connected to a single stake 16 and a single pocket 14. In this case, two of the connecting rods 114 are used, one for each rail. The connecting member 116 may have a pair of the openings provided therein for receiving the end of the rods, where such adjacent rail sections are found, and the caps 73 may have multiple openings 120 defined therein at appropriate locations to permit the rods 114 to pass therethrough.

With reference to FIG. 14A, a second embodiment of the rail locking mechanism 96 according to the invention will now be described. This embodiment includes components similar to those in the first embodiment, but differs primarily in the structures associated with the ends of the connecting rod 124, and in the associated structure of the pocket 14. Particularly, the upper end 125 of the connecting rod 124 may be enlarged in a substantially T-shape, and the lower end of the rod may have a pivot handle 126 pivotally connected thereto via an eccentric connection 127. With such structure, the handle 126 may be rotated about a vertical axis, corresponding to the rod 124, for selectively engaging and disengaging the T-shaped upper end 125 with the slot 87 formed in the bottom wall of the rail inner channel 86, for thereby connecting and disconnecting the rail 22 to the stake 16 and pocket 14; and the handle 126 may also be rotated about a horizontal axis, which causes the eccentric connection 127, which is in engagement with a bottom wall of the pocket 14, to move the connecting rod 124 upwardly or downwardly in the stake inner section 58. When the rod's upper end 125 is engaged with the bottom wall of the rail 22 in the inner channel 86, and the rod is drawn downwardly by rotation of the handle 126, this correspondingly draws the rail 22 onto tight engagement with the stake 16, and draws the stake into tight engagement with the pocket 14.

In this embodiment, the movable section 32 of the pocket 14 does not interfere with movements of the handle 126 when the section 32 is in the open position thereof, but will prevent the handle from being moved when the section 32 is in the closed position thereof. This is, of course, desirable to maintain the rail, stake and pocket tightly connected together when the trailer is traveling. Further, the base and/or movable sections of the pocket 14 will be modified, in this embodiment, to accommodate the handle 126 and/or the eccentric pivot connection 127.

The connecting member 116 may, optionally, be used in this embodiment, although it does not require a threaded opening therein to be connected to the enlarged T-shaped upper end 125 of the rod, or instead, the connecting member 116 may be replaced by a thin flat plastic reinforcing member 119 with a suitably-shaped opening to receive the tip end 125 of the connecting rod 124 therethrough. If the connecting member 116 is formed of plastic, it will desirably prevent direct contact between the rod upper end 114 and the rail. Alternatively, the connecting member 116 may be omitted, and the rod upper end 125 may have a plastic cover or coating provided thereon, to prevent contact between the steel rod and the aluminum rail.

Tarp Cover and Bows

With reference to FIG. 1, the tarp cover 24 extends over the flatbed trailer from the headboard 26 to the end cap 28. The tarp cover 24 also extends downwardly above the longitudinal sides of the trailer 12 to approximately the level of the rails 22, or the upper portions of the panels 18, so as to enclose the upper portion of the cargo space defined by the panels 18, stakes 16, headboard 26 and end cap 28. Although not shown, ropes, elastic cords and the like may additionally be used to further secure the lower edges of the tarp cover to the trailer in a conventional manner, e.g., extending between openings/eyelets near the edges of the tarp cover and the sides of the trailer.

The bows 25 extend beneath the tarp cover 24 to support same. The bows 25 may be arch-shaped as shown, oriented with the height of the arch at the top, or may be flat or any other desired shape. Opposite ends of each bow 25 may be operatively connected to and supported in recesses 94 of the bow end supporting members 92 provided on the rails 22, as discussed above and shown in FIG. 12B.

The bows 25 can be made of any appropriate material(s), though extruded aluminum is suited well for the application, while the tarp 24 may be formed of vinyl, cloth-reinforced vinyl, or any other material as desired, including mesh or porous materials. Each of the bows 25 may be formed as one continuous member, or in multiple sections joined together.

Figure 19:
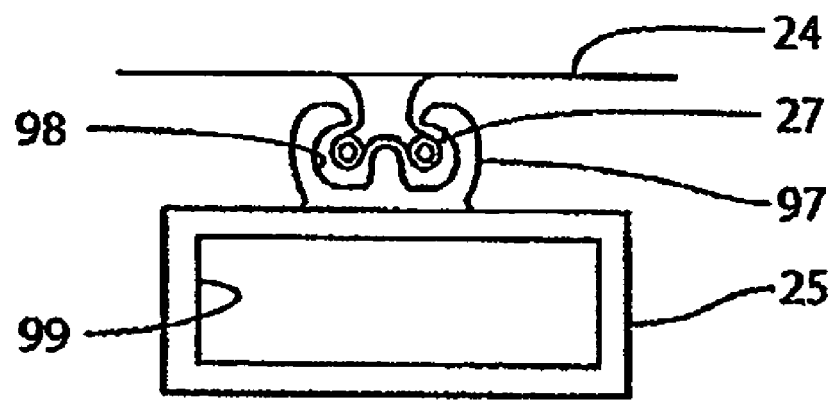
FIG. 19 is a cross sectional view of a bow according to an embodiment of the invention.

A cross section of an embodiment of a bow 25, according to an embodiment of the invention, is shown in FIG. 19. As depicted the cross section is substantially a rectangular tube, with a projection 97 extending from one face of the tube and having a lobed groove or recess 98 formed therein. For securely connecting the tarp cover 24 to the bow 25, folds of the tarp cover may be inserted into the lobes of the groove 98 and then a pair of retaining inserts 27, such as plastic tubes, may be slid into the folds, respectively. In this manner, the inserts 27 normally prevent the cover folds from being withdrawn upwardly out of the lobed groove, but if it is desired to separate the cover from the bow for repair, replacement or any other reason, this can readily be accomplished by first longitudinally sliding the inserts 27 out of the groove.

Also, the tarp cover 24 may be formed in segments, rather than as one large piece, as is conventionally known. In such case, the same bow 25 as shown in FIG. 19 may be used to support the cover segments. Particularly, edges of the segments will be enlarged, e.g., by having a tube or cord sewn into opposite edge flaps of each segment, and then the enlarged edges of a pair of the cover segments may be slidably inserted into the lobes of the groove on each of the bows. From the outside of the cover 24, the segmented cover is virtually visually indistinguishable from the one-piece cover.

Although the bows 25 and tarp cover 24 may be supported on the rails 22 as discussed above, if desired, the rails 22 could be omitted, and the bows supported directly by the stakes 16. For example, the caps 73 at the upper ends of the stakes could have openings formed therein which are adapted to securely receive the bow ends therein. Alternatively, an upward projection could be provided at the upper end of each of the respective stakes, which is shaped to have the hollow opening 99 of the bow slidably fitted thereover.

Rolling Retraction System for Tarp Cover

Further, although the bows 25 and tarp cover 24 may be non-slidably supported on the rails 22 or the stakes 16 as discussed above, in another embodiment according to the present invention, a rolling retraction system may be provided for the tarp cover, and an embodiment of such an optional rolling retraction system is shown in FIGS. 8 and 15-18.

As shown in FIG. 15, this embodiment includes a modification to the rails 22' in the form of an integral, substantially T-shaped upward extension 130 that functions as a support track for supporting rolling movement of outer and inner rolling guide assemblies 132, 134 thereon. The guide assemblies 132, 134 are operatively connected to the lower ends of the bows 25. Also, connecting or locking mechanisms (not shown) are provided for securing opposite ends of the cover system in the fully covering position of the cover shown in FIG. 1, with opposed ends of the tarp 24 adjacent the headboard 26 and end cap 28, respectively.

In this embodiment, the T-shaped upward extension 130 replaces the vertical wall 90 of the rails 22 in the first embodiment, as the tarp cover 24 and bows 25 are supported by the extension 130 and guide assemblies as discussed further below. With the rolling retraction system, the tarp cover may be readily and conveniently moved to various positions, as desired, for selectively uncovering portions of the flatbed trailer for cargo loading and unloading, or for any other reason.

Also, according to this modified embodiment of the invention, when the tarp cover 24 is retracted to a fully open position thereof, the collapsed cover and bows may be conveniently locked in position at the front of the trailer adjacent the headboard 26, and supported on the short, forward-most sections of the rails 22' on opposite sides of the trailer. In this condition, with the tarp cover 24 and bows 25 locked to the headboard 26, the larger sections of the rails 22' may be temporarily removed and stored, if desired.

As shown best in FIG. 15, the T-shaped upward extension 130 of the rail 22' may be formed integrally therewith, e.g., the rail 22' including the extension may be integrally formed of appropriate material(s) such as extruded aluminum, which is durable and lightweight. The lower and/or upper surfaces of the upper portion of the extension 130 may have projections 133 formed thereon. and the wheels 136 may have peripheral grooves formed therein which are shaped similar to the projections, and engage the projections for rolling movement therealong. For example, the projections 133 could be tapered with a V-shaped cross section and the peripheral groove may similarly have a corresponding V-shaped cross section, such as shown in FIG. 15.

Alternatively, as shown in FIG. 8, the extension 130 may be formed separately from the rail 22' and connected thereto. An upper portion of the extension 130 may have a flat upper surface 135 which supports wheels 136 of the guide assemblies 132, 134 for rolling movement thereon, and the upper surface 135 may also have an insert 138 provided therewith, e.g., fitted in a shallow recess formed in the upper surface of the extension 130, as shown. The insert 138, where used, maybe formed of an appropriate material such as plastic, steel, or other appropriate material, and may be removable so as to be readily replaced if desired or necessary. Additionally, the upper portion of the extension 130 may include wheel guide recesses 140 formed in the lower surface thereof and which receive other wheels 136 of the guide assemblies 132, 134 for rolling movement therealong. The recesses 140 may be concavely curved, as shown, but could be other shapes if desired, including U-shaped, V-shaped and flat.

Figure 15A:
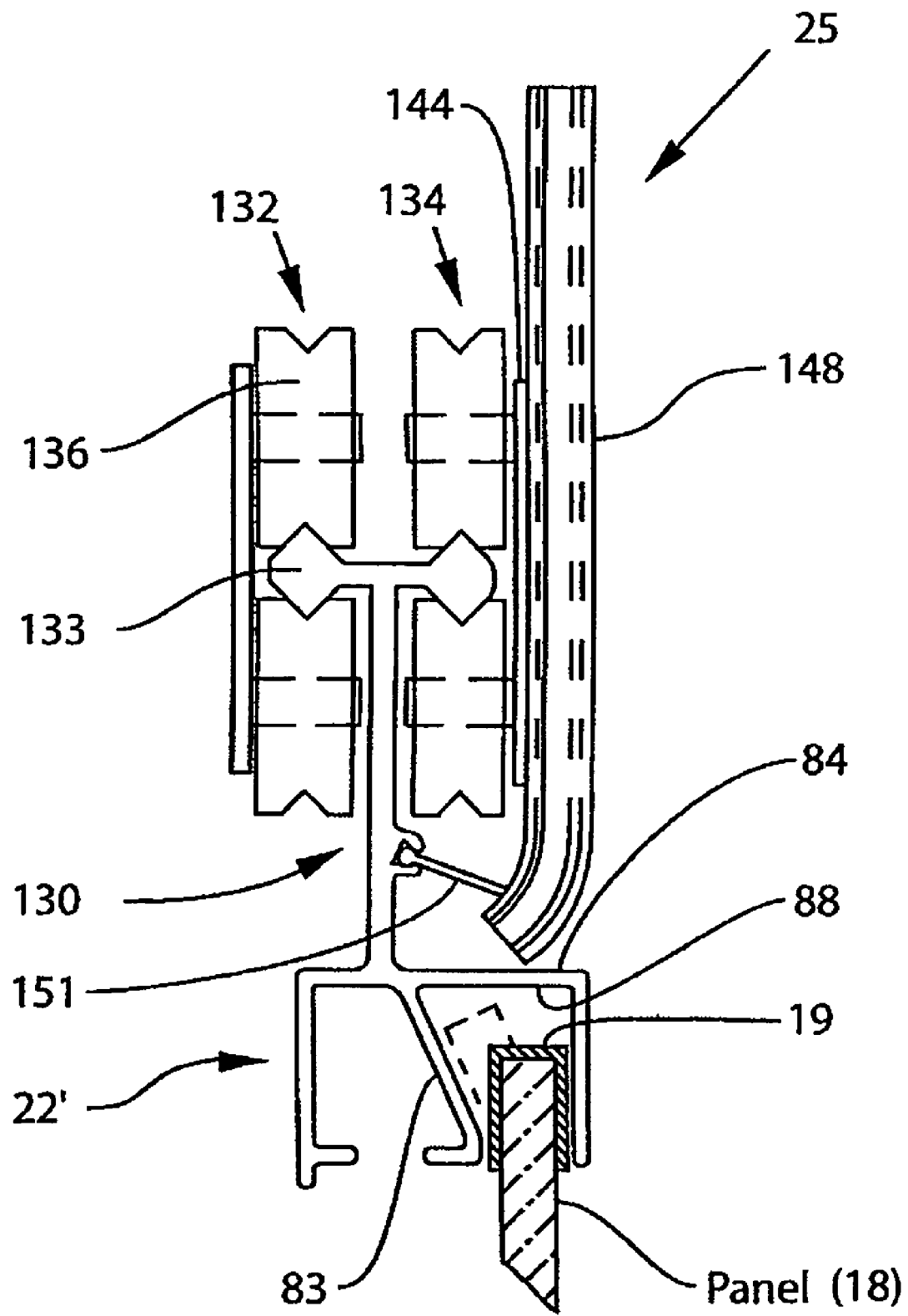
FIG. 15A is a cross-sectional detail view showing a side portion of a trailer bed and cover system according to another embodiment of the invention, including the top rail and guide assemblies including movable bow supports.

Referring to FIGS. 15A-15C and 17, the outer guide assembly 134 of this embodiment may include a vertically extending support plate 144 which may be substantially triangular in shape, a plurality of the wheels 136 (e.g., three in the depicted embodiment) rotatably supported on the plate via shafts projecting horizontally from the plate at two vertically spaced levels such that the wheels engage the upper and lower surfaces of the upper portion of the extension 130 as shown in FIG. 15A, a receiver or bracket 146 fixed to the upper portion of the plate 144 for slidably receiving and supporting an end of one of the bows 25, and a tarp clip 148 connected to an outer surface of the plate 144 below the bracket 146. The tarp clip 148 may have a projection on its outer surface with a lobed groove formed therein which is shaped the same as and aligned with the lobed groove on the bows 25, and may also have a lower portion which curves inwardly below the plate 144 and the wheels 136 and terminating in close, but spaced relation to the rail 22' where it may be engaged by a seal 151 extending from the extension 130 of the rail 22'. The tarp cover extends below the ends of the bows 25 on opposite sides of the trailer, and downwardly extending portions of the cover may be secured to the tarp clips 148 by being inserted in the lobed grooves of the tarp clips in the same manner as discussed in relation to the lobed grooves of the bows 25. The lowermost edges of the tarp cover may be enlarged or weighted, e.g., by having a tube or cord sewn into an overlap of material forming the edge, and portions of the cover's lower edges may be secured to lower, inner ends of the tarp clips using appropriate fasteners. With such construction, the tarp cover 24 encloses the guide assembly 132 such that the carriages 132 are protected from exposure to water and other foreign matter, and do not detract from the aesthetic appearance of the cover system. Also, due to the disposition of the side edges of the tarp cover which extend inwardly with the tarp clips 148 close to extension 130, together with the seal 151 extending from the extension to engage the inner surface of the tarp clip as shown, the tarp cover provides an excellent, reliable seal against water and other foreign matter entering within the enclosed space of the cover system Referring to FIGS. 15A-15C and 18, the inner guide assembly 134 of this embodiment may have a similar structure to that of the outer guide assembly 132, e.g., a vertically extending support plate 150 which may be substantially triangular in shape, a plurality of the wheels 136 (e.g., again, three in the depicted embodiment) rotatably supported on the plate via shafts projecting horizontally from the plate at two vertically spaced levels such that the wheels engage the upper and lower surfaces of the upper portion of the extension 130 as shown in FIG. 15, and a receiver or bracket 152 projecting outwardly from an outer face of the upper portion of the plate 144 via arms 154 for slidably receiving and supporting an end of one of the bows 25. As depicted, the bracket 152 is aligned with the bracket 146, e.g., at the same vertical level and the same outward disposition as the bracket 146, so that the tarp cover is uniformly supported by the brackets 146, 152, and the cover also encloses the guide assemblies 134. Also, each of the brackets may have an opening or slot formed in the outer face thereof so that the brackets may tightly engage most of the periphery of each bow 2 except for the projection, and will correspondingly not interfere with the tarp cover 24 where it extends from the lobed groove within the projection.

Figure 15B:
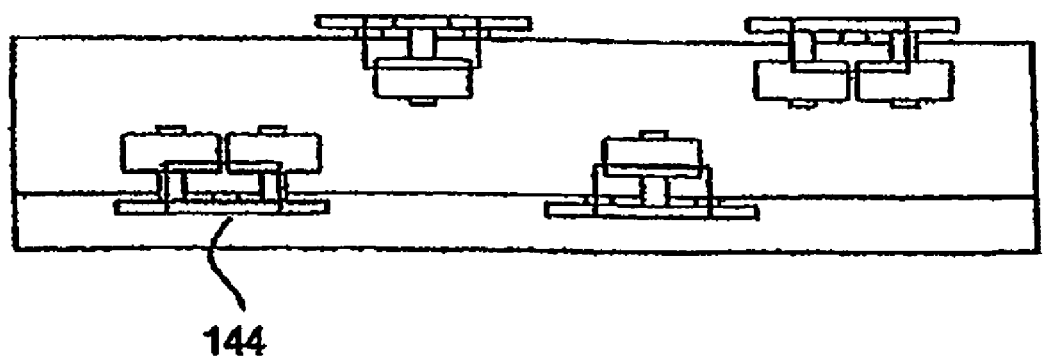
FIG. 15B is a top plan view of the top rail and guide assemblies of FIG. 15A.
Figure 15C:
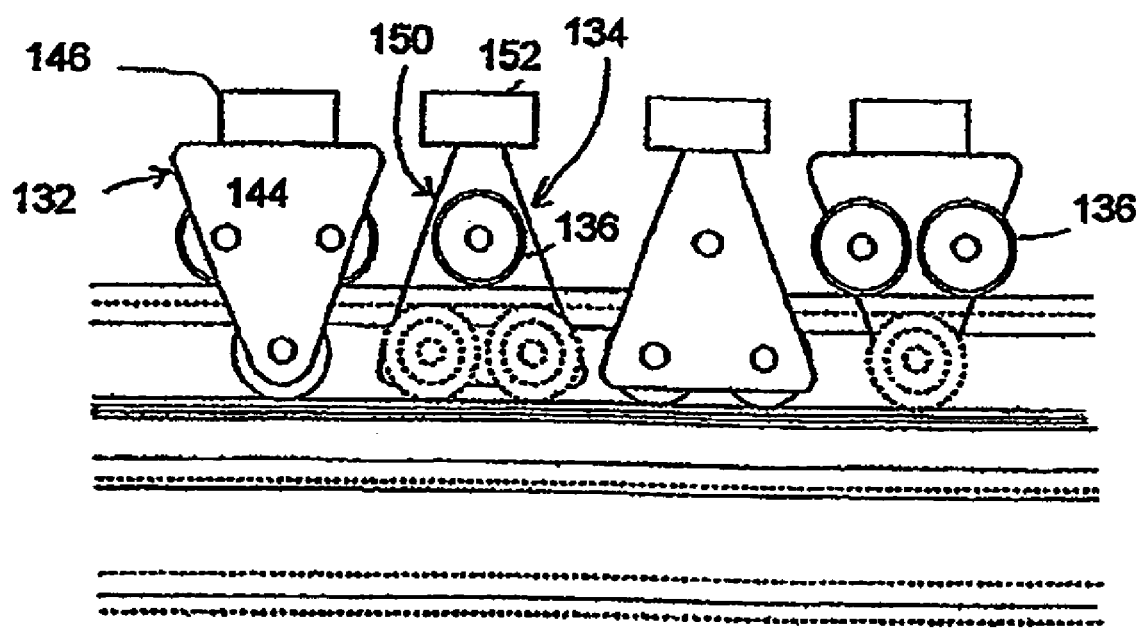
FIG. 15C is a side plan view of the top rail and guide assemblies of FIG. 15A.
Figure 16:
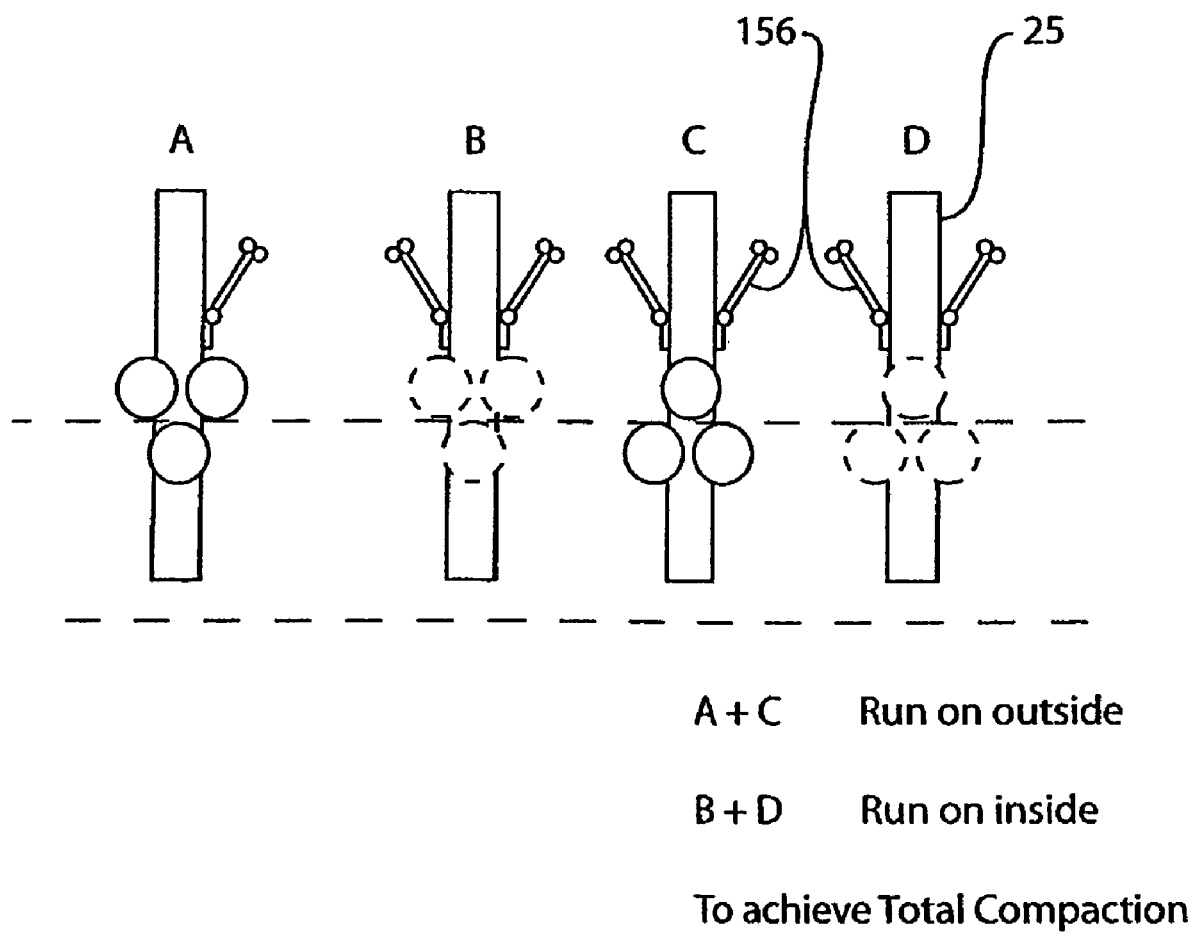
FIG. 16 is a simplified side view showing a plurality of guide assemblies supporting ends of the bows and operatively engaged with the upper rail.
Figure 17A:
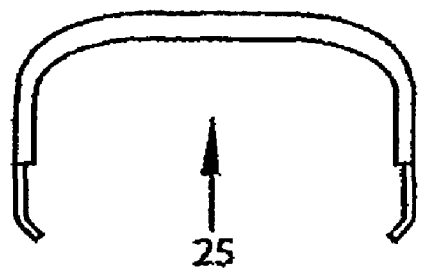
FIG. 17A is a side plan view of an individual bow according to an embodiment of the invention.
Figure 17B:
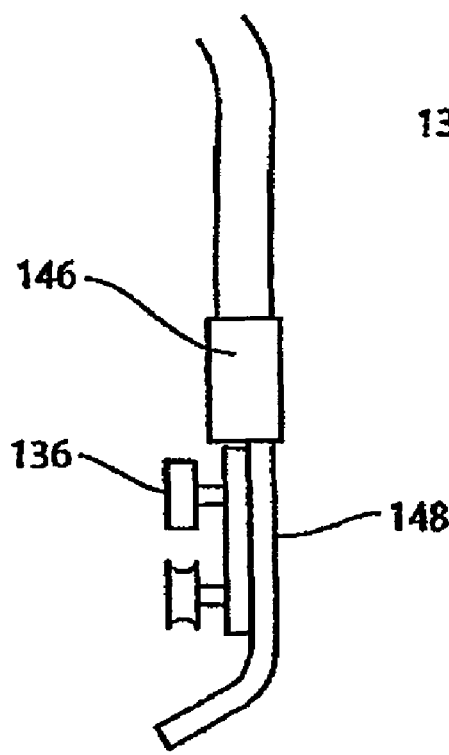
FIG. 17B is a side view of an end portion of the bow of FIG. 17A, showing part of a guide assembly thereon.
Figure 17C:
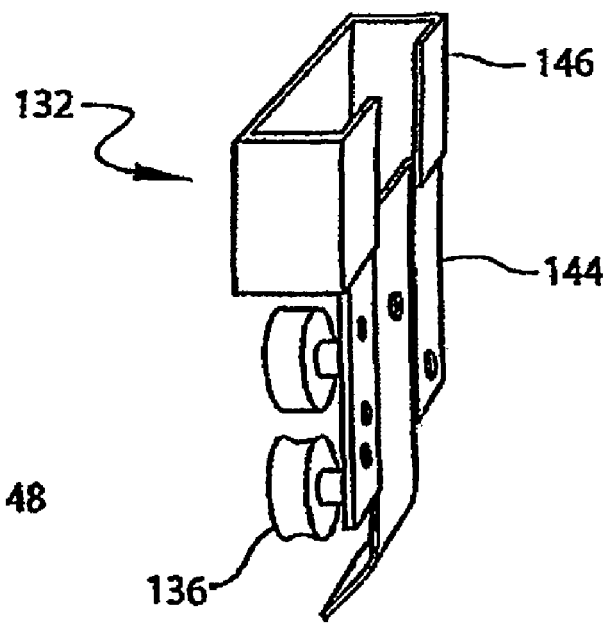
FIG. 17C is a detail perspective view of the guide assembly of FIG. 17B.
Figure 18:
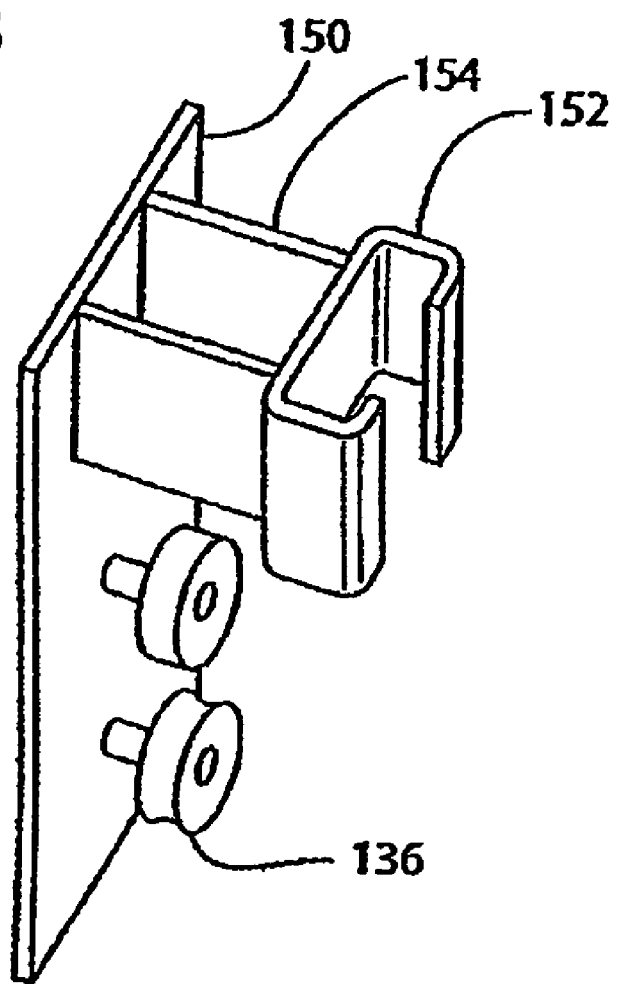
FIG. 18 is an enlarged perspective view of an inner guide assembly.

The outer and inner guide assemblies 132, 134 may be alternately disposed with each other in the longitudinal direction of the trailer, while approximately half of the triangular support plates 144, 150 may be oriented in one direction while the rest of the plates are oriented in the opposite direction, as shown in FIGS. 15 and 16, to achieve a desirably compact arrangement of the tarp cover 24 and bows 25 in the fully retracted position of the cover, e.g., completely supported on the short, forward most sections of the rails 22'. Particularly, as shown in FIGS. 15B, 15C, and 16, the outer and inner guide assemblies 132, 134 may be alternately disposed with each other in the longitudinal direction of the trailer, while the support plates 144, 150 may be arranged such that two adjacent plates 144, 150 are disposed in one orientation, and the next two plates in the longitudinal direction are disposed in the opposite orientation, etc. In this manner, all of the bows 25 can be disposed closely adjacent to each other in the retracted position of the cover system because the guide assemblies will not interfere with other.

Of course, those skilled in the art will realize that other possible arrangements of the guide assemblies are possible, e.g., all guide assemblies may be positioned on the outer side of the extension 130. Similarly, other possible shapes and arrangements of the support plates are possible, e.g., rectangular shaped plates each supporting four of the wheels, triangular shaped plates which wherein each plate is disposed in the opposite orientation to the plate(s) adjacent thereto, etc.

Generally, the tarp cover 24 may tend to sag between the bows. To avoid this lifter bows 156 may be provided in conjunction with the bows 25, wherein the lifter bows collapse adjacent to the bows 25 in the fully retracted position of the cover system, but pivot away from opposite sides of the bows 25 in the full covering position of the tarp cover, and upper horizontal portions of the lifter bows 156 may engage portions of the tarp cover, pushing the portions upwardly and thereby tensioning the cover to some extent. Additionally, the cover system may also include one or more mechanisms (not shown) for tensioning the tarp cover in the full covering position thereof, noting that a tensioned tarp is more aerodynamic and aesthetic than an un-tensioned tarp. Such tensioning mechanisms may operatively connect the front bulkhead 26 to the front-most bow 25 and/or operatively connect the end cap 28 to the rear-most bow 25.

With the disclosed rolling retraction system, the cover system may be easily and conveniently moved to a desired position by a person standing on the ground adjacent to the trailer. For example, if tensioning mechanism(s) other than lifter bows are used, the mechanisms may be manipulated by the person to release the tension, then one or both ends of the tarp cover may be released from being connected to the bulkhead 26 and end cap 28, after which the tarp cover 24 and supporting bows 25 may be simply moved to a desired position by the person using a pole, strap, etc. to engage a portion of the cover, one of the bows or one of the guide assemblies 132, 134, and then simply pulling or pushing the same as the operator walks alongside of the trailer. The rolling engagement between the wheels 136 of the guide assemblies and the extension 130 permit smooth, continuous movement of the cover system with little effort.

As with the other embodiment of the rails 22, in this embodiment the rails 22' may be removed if desired. Again, the tarp cover 24 and bows 25 may be compactly stored at one end of the trailer, e.g., the front end, on short sections of the rail 22' adjacent the bulkhead 26. Removal of the remaining sections of the rails 22' can be performed from the ground, e.g., the rail locking mechanisms can be released, the rail sections may then be raised off of the stakes 16 and panels 18 using a pole, and then lowered to the ground by a person standing next to the trailer. The rail sections 22' may be formed of relatively lightweight materials such as extruded aluminum, and may be stored on the flatbed when not in use.

The tarp cover supported by the guide assemblies 132, 134 and the rail extension 130, as in the embodiment discussed above, is another important aspect of the invention. Such arrangement is much more convenient and aesthetic than the conventional bow-supported tarp cover draped over the upper portions of the stake-supported panels and secured with ropes, elastic cords and the like. Although rolling tarp cover systems for flatbed trailers are known, e.g., some of the present inventors have previously patented such systems as disclosed in U.S. Pat. Nos. 5,924,759, 5,152,757 and 5,080, 422, the entire disclosures of which are incorporated herein by reference, such known systems typically include guide rails permanently mounted to the sides of the trailer's flatbed, and an enclosed cargo space defined between the tarp cover and the flatbed. None of the known rolling tarp systems are provided for use in conjunction with removable rails or with a removable, stake-supported panel cover system, nor are they disposed at an elevated level above stake-supported panels as in the present invention.

Headboard and End Cap

Flatbed trailers typically include a headboard. According to the present invention the headboard 26 may be extended to provide a convenient place to stow components of the cover system when not deployed. As depicted, the headboard extension extends longitudinally and rearwardly of the trailer. The extension may include a rigid sidewall attached to each side of the headboard, and an arching rigid span extending between the two sidewalls. Optionally, the headboard may be provided with a door (not shown) to allow a user to enter the storage area thereof.

Again, an important aspect of the invention is the conveniently removable nature of components the of the cover system by persons standing adjacent to the trailer, e.g., the stakes 16, panels 18 and rails 22 or 22', as well as the tarp cover 24 and bows 25 if the guide assemblies 132, 134 are not used.

Figure 20:
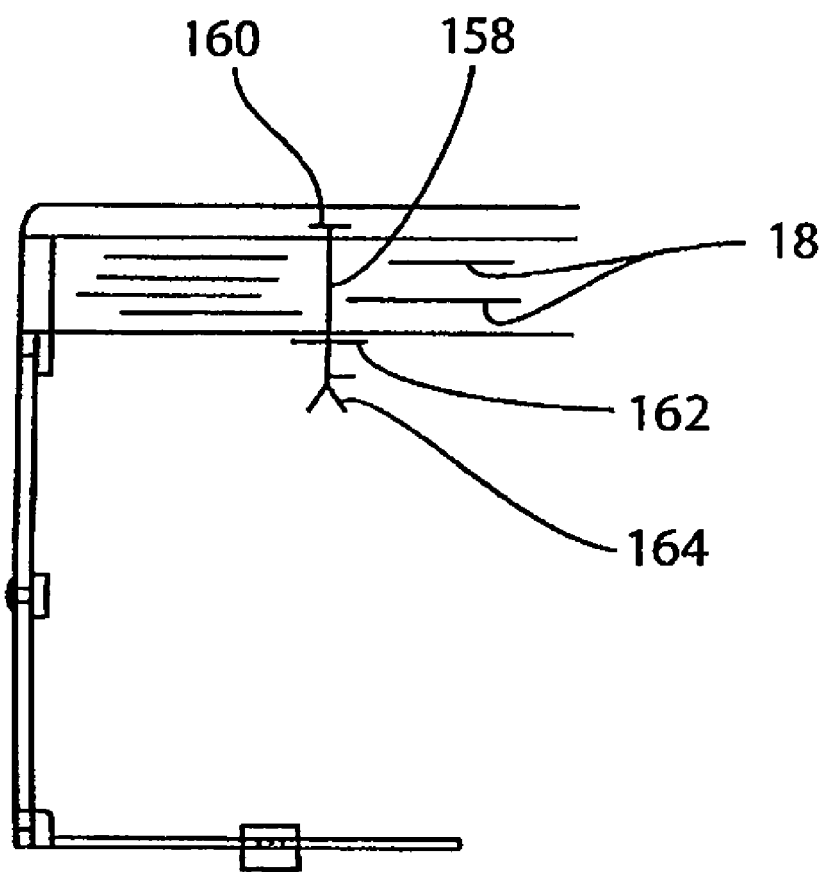
FIG. 20 is an end plan view of a front portion of the flatbed trailer and a headboard according to an embodiment of the invention.

As discussed above, the rails 22, 22' may be detached by releasing the rail locking mechanism 96, then removed and stored on the trailer. Depending on length(s) of the rails, they may be stored at various positions on the trailer, including within the space enclosed by the headboard. According to another aspect of the invention, the panels 18 and stakes 16 may be conveniently stored within the headboard, using an arrangement as shown in FIG. 20. Particularly, half of the panels 18 may be stored face-to-face on one side of the headboard, the other half of the panels may be similarly stored on the other side of the headboard, and then an appropriate mechanism is used to maintain the panels in such storage positions. As depicted, such a mechanism may include a rod 158 having one end secured/securable to the headboard, e.g., the end is hooked and is pivotally associated with a ring or bar 160 fixed to the headboard, the other end of the rod may be threaded and a large flat washer 162 and a wing nut 164 placed over the threaded end and manipulated until the panels are securely clamped between the washer 162 and the headboard. The stakes 16 may also be disposed in a vertical, side-to-side arrangement between the panels and the headboard, and commonly clamped with the panels between the washer 162 and the headboard. If the bows 25 are removed, they may also be conveniently stored within the headboard, e.g., within the arched upper portion thereof using appropriate securing mechanism(s).

As depicted, the end cap 28 may be substantially semicircular, and removably attached to the upper ends of the rear stakes 25 and/or to the rear, transversely extending rail 22. For example, an attachment hole may be formed into the rail on both sides of the end cap and bracket(s) may be provided for each side of the end cap that can be attached by a bolt or other fastener to the attachment holes in the rails.

The present invention is not limited in its application to the details of construction and to the dispositions of the components set forth in the foregoing description or illustrated in the appended drawings in association with the present exemplary embodiments of the invention. The present invention is capable of other embodiments and of being practiced and carried out in various ways. In addition, it is to be understood that the phraseology and terminology employed herein are for the purposes of illustration and example, and should not be regarded as limiting.

As such, those skilled in the art will appreciate that the concepts, upon which this disclosure is based, may readily be utilized as a basis for the designing of other structures, methods and systems for carrying out the several purposes of the present invention. It is important, therefore, that the claims be regarded as including such equivalent constructions. For example, the stakes and retaining pockets according to the invention may be used to support panels other than on a trailer, e.g., they may be used to support clear plastic panels surrounding a hockey rink. In such application, the stakes may be disposed opposite to the disposition on a trailer, i.e., the surfaces of the clear plastic panels facing inwardly of the hockey rink would be substantially flush with the outer surface of the stake section facing inwardly of the rink.

Although the present invention has been described herein with respect to a number of specific illustrative embodiments, the foregoing description is intended to illustrate, rather than to limit the invention. Those skilled in the art will realize that many modifications of the preferred embodiment could be made which would be operable. All such modifications, which are within the scope of the claims, are intended to be within the scope and spirit of the present invention.

What is claimed is:

1. A cover system for a support surface on a vehicle, the cover system including multiple retaining pockets disposed at a lateral side of the vehicle adjacent the support surface comprising:
   multiple stakes having lower ends which are removably received in said retaining pockets, respectively, such that the stakes extend substantially perpendicular to the support surface,
   multiple panels retained by said stakes at the lateral side of the vehicle,
   a rail supported on upper surfaces of said stakes such that the rail extends substantially parallel to a longitudinal direction of the vehicle,
   a locking mechanism which selectively locks the rail to at least one of said stakes and at least one of said pockets and wherein an upper portion of said locking mechanism extends into and operatively engages said rail.

2. A cover system for a support surface on a vehicle, the cover system including multiple retaining pockets disposed at a lateral side of the vehicle adjacent the support surface, comprising:
   multiple stakes having lower ends which are removably received in said retaining pockets, respectively, such that the stakes extend substantially perpendicular to the support surface,
   multiple panels retained by said stakes at the lateral side of the vehicle, a rail supported on upper surfaces of said stakes such that the rail extends substantially parallel to a longitudinal direction of the vehicle,
   a locking mechanism which selectively locks the rail to at least one of said stakes and at least one of said pockets wherein the locking mechanism comprises an elongate member extending through one of said stakes, a lower portion of the elongate member is operatively connected to one of said pockets in which said one stake is disposed, and an upper portion of said elongate member selectively engages the rail to connect the rail, the pocket, and the stake together.

3. The cover system according to claim 2, wherein the lower portion of the elongate member includes a handle to facilitate rotation of the elongate member, and a cam member which selectively moves the elongate member vertically relative to the rail.

4. The cover system according to claim 2, wherein the elongate member is manipulable by an operator to effect locked and unlocked positions of the locking mechanism.

5. The cover system according to claim 4, wherein an upper end of the elongate member is threaded and selectively engages a threaded member of the rail, and another portion of the elongate member is rotatable by the operator.

6. The cover system according to claim 4, wherein the upper portion of the elongate member is substantially T-shaped, and the elongate member may be rotated between a locked position in which the T-shaped upper portion is locked to the rail, and an unlocked position in which the T-shaped upper member is not locked to the rail.

7. In a cover system for a support surface on a vehicle, the cover system including multiple retaining pockets disposed at a lateral side of the vehicle adjacent the support surface, comprising multiple stakes having lower ends which are removably received in said retaining pockets, respectively, such that the stakes extend substantially perpendicular to the support surface and also having channels defined along longitudinal sides thereof, multiple separate panels having edges retained in the channels of said stakes at the lateral side of the vehicle such that the panels may be individually removed from and provided to the cover system, a rail supported on upper surfaces of said stakes such that the rail extends substantially parallel to a longitudinal direction of the vehicle, and a locking mechanism which selectively locks the rail to at least one of said stakes and at least one of said pockets; and wherein said pockets open upwardly such that the lower end of the stakes may be vertically slid into the pockets, and the locking mechanism locks the rail to an upper portion of the stake and locks the pocket to a lower portion of the stake.

8. The cover system according to claim 7, including a plurality of said rails which are supported on the upper surfaces of said stakes such that the rails extend end to end along the lateral side of the vehicle, and including multiple said locking mechanisms which selectively lock said rails, to said stakes and said pockets.

9. The cover system according to claim 8, wherein one said stake supports opposed ends of two adjacent ones of said rails.

10. The cover system according to claim 7, wherein said panels are rigid members, and an opening is defined along a lower end of said rail and upper portions of said panels extend through said opening into said rail.

11. The cover system according to claim 10, wherein said upper portions of said panels normally extend into a lower portion of said rail, the panels may be selectively raised relative to the rail such that the upper portions of the panels extend into an upper portion of said rail, and said panels may be selectively removed from the system while the rail remains locked with said locking mechanism.

12. The cover system according to claim 10, wherein first and second channels are defined in said rail, an upper portion of said locking mechanism extends into and operatively engages said first channel, and said panel extends into said second channel.

* * * * *